United States Patent
Arazaki

(10) Patent No.: US 7,801,355 B2
(45) Date of Patent: Sep. 21, 2010

(54) IMAGE PROCESSING METHOD, IMAGE PROCESSING DEVICE, SEMICONDUCTOR DEVICE, ELECTRONIC APPARATUS, IMAGE PROCESSING PROGRAM, AND COMPUTER-READABLE STORAGE MEDIUM

(75) Inventor: Shinichi Arazaki, Shimosuwa-machi (JP)

(73) Assignee: Seiko Epson Corporation (JP)

( * ) Notice: Subject to any disclaimer, the term of this patent is extended or adjusted under 35 U.S.C. 154(b) by 1165 days.

(21) Appl. No.: 11/056,352

(22) Filed: Feb. 11, 2005

(65) Prior Publication Data

US 2005/0190200 A1 Sep. 1, 2005

(30) Foreign Application Priority Data

Feb. 13, 2004 (JP) .............................. 2004-036799
Oct. 5, 2004 (JP) .............................. 2004-292364

(51) Int. Cl.
*G06K 9/00* (2006.01)
(52) U.S. Cl. .................... 382/162; 348/222.1; 348/234; 348/235; 348/237; 348/264; 348/265; 348/255; 358/518; 358/520; 358/525; 382/254; 382/276
(58) Field of Classification Search ............... 382/162, 382/299, 300, 302, 304, 254, 276; 348/234, 348/262, 265, 266, 273, 280, 29, 33, 34, 348/222.1, 235, 237, 276, 441, 453, E11.021; 358/518, 520, 525
See application file for complete search history.

(56) References Cited

U.S. PATENT DOCUMENTS 5,140,413 A * 8/1992 Suzuki et al. ............... 358/518
2002/0012054 A1 * 1/2002 Osamato .................... 348/273

2004/0075755 A1 * 4/2004 Rantanen et al. ........ 348/231.99
2004/0086193 A1 * 5/2004 Kameyama et al. ......... 382/254

FOREIGN PATENT DOCUMENTS

JP   2000-232655   * 12/1999
JP   2000-232655     8/2000
JP   2001-119706     4/2001

(Continued)

OTHER PUBLICATIONS

Official English Translation of previously cited JP2000-232655.*

*Primary Examiner*—Vikkram Bali
*Assistant Examiner*—Julian D Brooks
(74) *Attorney, Agent, or Firm*—Harness, Dickey & Pierce, P.L.C.

(57) ABSTRACT

An image processing method comprising a step of performing a color interpolation process on image data output from a single-chip color image capturing sensor to calculate color data for each pixel and a step of converting the color data using a predetermined transformation formula and of filtering the converted data, and the transformation formula is replaced based on the magnitude of a color value of the color data. When a color value of a specific color is large, the transformation formula can be appropriately changed. Therefore, it is possible to prevent the lowering of the overall resolution without being affected by the resolution of the color. Further, it is possible to reliably reproduce a smooth and natural edge of an image without adding other processes to the color interpolation process.

14 Claims, 12 Drawing Sheets

| THRESHOLD VALUE CONDITIONS | TRANSFORMATION FORMULA USED |
|---|---|
| R, B < G × 1.125 | (A) |
| G × 1.125 ≤ R, B < G × 1.375 | (B) |
| G × 1.375 ≤ R, B < G × 1.625 | (C) |
| G × 1.625 ≤ R, B < G × 1.875 | (D) |
| G × 1.875 ≤ R, B | (E) |

| THRESHOLD VALUE CONDITIONS | TRANSFORMATION FORMULA USED |
|---|---|
| R, B < G × 1.25 | (A) |
| G × 1.25 ≤ R, B < G × 1.75 | (C) |
| G × 1.75 ≤ R, B | (D) |

FOREIGN PATENT DOCUMENTS

| | | |
|---|---|---|
| JP | 2001-157217 | 6/2001 |
| JP | 2001-231052 | 8/2001 |
| JP | 2001-258040 | 9/2001 |
| JP | 2002-010280 | 1/2002 |
| JP | 2003-244711 | 8/2003 |

* cited by examiner

FIG. 8A
$$\begin{pmatrix} Y \\ Cb \\ Cr \end{pmatrix} = \begin{pmatrix} 0.25 & 0.5 & 0.25 \\ -0.25 & -0.5 & 0.75 \\ 0.75 & -0.5 & -0.25 \end{pmatrix} \begin{pmatrix} R \\ G \\ B \end{pmatrix}$$

FIG. 8B
$$\begin{pmatrix} Y \\ Cb \\ Cr \end{pmatrix} = \begin{pmatrix} 0.1875 & 0.625 & 0.1875 \\ -0.1875 & -0.625 & 0.8125 \\ 0.8125 & -0.625 & -0.1875 \end{pmatrix} \begin{pmatrix} R \\ G \\ B \end{pmatrix}$$

FIG. 8C
$$\begin{pmatrix} Y \\ Cb \\ Cr \end{pmatrix} = \begin{pmatrix} 0.125 & 0.75 & 0.125 \\ -0.125 & -0.75 & 0.875 \\ 0.875 & -0.75 & -0.125 \end{pmatrix} \begin{pmatrix} R \\ G \\ B \end{pmatrix}$$

FIG. 8D
$$\begin{pmatrix} Y \\ Cb \\ Cr \end{pmatrix} = \begin{pmatrix} 0.0625 & 0.875 & 0.0625 \\ -0.0625 & -0.875 & 0.9375 \\ 0.9375 & -0.875 & -0.0625 \end{pmatrix} \begin{pmatrix} R \\ G \\ B \end{pmatrix}$$

FIG. 8E
$$\begin{pmatrix} Y \\ Cb \\ Cr \end{pmatrix} = \begin{pmatrix} 0.0 & 1.0 & 0.0 \\ 0.0 & -1.0 & 1.0 \\ 1.0 & -1.0 & 0.0 \end{pmatrix} \begin{pmatrix} R \\ G \\ B \end{pmatrix}$$

FIG. 9A

| THRESHOLD VALUE CONDITIONS | TRANSFORMATION FORMULA USED |
|---|---|
| R, B < G × 1.125 | (A) |
| G × 1.125 ≤ R, B < G × 1.375 | (B) |
| G × 1.375 ≤ R, B < G × 1.625 | (C) |
| G × 1.625 ≤ R, B < G × 1.875 | (D) |
| G × 1.875 ≤ R, B | (E) |

FIG. 9B

| THRESHOLD VALUE CONDITIONS | TRANSFORMATION FORMULA USED |
|---|---|
| R, B < G × 1.25 | (A) |
| G × 1.25 ≤ R, B < G × 1.75 | (C) |
| G × 1.75 ≤ R, B | (D) |

FIG. 9C

| THRESHOLD VALUE CONDITIONS | TRANSFORMATION FORMULA USED |
|---|---|
| R, B < G × 1.5 | (A) |
| G × 1.5 ≤ R, B | (D) |

FIG. 11A

| THRESHOLD VALUE CONDITIONS | WEIGHT OF TRANSFORMATION FORMULA SYNTHESIS | |
|---|---|---|
| | A | E |
| R, B < G × 1.125 | 1.0 | 0.0 |
| G × 1.125 ≤ R, B < G × 1.375 | 0.75 | 0.25 |
| G × 1.375 ≤ R, B < G × 1.625 | 0.5 | 0.5 |
| G × 1.625 ≤ R, B < G × 1.875 | 0.25 | 0.75 |
| G × 1.875 ≤ R, B | 0.0 | 1.0 |

FIG. 11B

| THRESHOLD VALUE CONDITIONS | WEIGHT OF TRANSFORMATION FORMULA SYNTHESIS | |
|---|---|---|
| | A | E |
| R, B < G × 1.25 | 1.0 | 0.0 |
| G × 1.25 ≤ R, B < G × 1.75 | 0.5 | 0.5 |
| G × 1.75 ≤ R, B | 1.0 | 1.0 |

FIG. 11C

| THRESHOLD VALUE CONDITIONS | WEIGHT OF TRANSFORMATION FORMULA SYNTHESIS | |
|---|---|---|
| | A | E |
| R, B < G × 1.5 | 1.0 | 0.0 |
| G × 1.5 ≤ R, B | 0.0 | 1.0 |

RGB → YC TRANSFORMATION FORMULA

YC → RGB TRANSFORMATION FORMULA (INVERSION FORMULA)

FIG. 12A $$\begin{pmatrix} Y \\ Cb \\ Cr \end{pmatrix} = \begin{pmatrix} 0.25 & 0.5 & 0.25 \\ -0.25 & -0.5 & 0.75 \\ 0.75 & -0.5 & -0.25 \end{pmatrix} \begin{pmatrix} R \\ G \\ B \end{pmatrix}$$

$$\begin{pmatrix} R \\ G \\ B \end{pmatrix} = \begin{pmatrix} 1.0 & 0 & 1.0 \\ 1.0 & -0.5 & -0.5 \\ 1.0 & 1.0 & 0 \end{pmatrix} \begin{pmatrix} Y \\ Cb \\ Cr \end{pmatrix}$$

FIG. 12B $$\begin{pmatrix} Y \\ Cb \\ Cr \end{pmatrix} = \begin{pmatrix} 0.1875 & 0.625 & 0.1875 \\ -0.1875 & -0.625 & 0.8125 \\ 0.8125 & -0.625 & -0.1875 \end{pmatrix} \begin{pmatrix} R \\ G \\ B \end{pmatrix}$$

$$\begin{pmatrix} R \\ G \\ B \end{pmatrix} = \begin{pmatrix} 1.0 & 0 & 1.0 \\ 1.0 & -0.3 & -0.3 \\ 1.0 & 1.0 & 0 \end{pmatrix} \begin{pmatrix} Y \\ Cb \\ Cr \end{pmatrix}$$

FIG. 12C $$\begin{pmatrix} Y \\ Cb \\ Cr \end{pmatrix} = \begin{pmatrix} 0.125 & 0.75 & 0.125 \\ -0.125 & -0.75 & 0.875 \\ 0.875 & -0.75 & -0.125 \end{pmatrix} \begin{pmatrix} R \\ G \\ B \end{pmatrix}$$

$$\begin{pmatrix} R \\ G \\ B \end{pmatrix} = \begin{pmatrix} 1.0 & 0 & 1.0 \\ 1.0 & -0.166667 & -0.166667 \\ 1.0 & 1.0 & 0 \end{pmatrix} \begin{pmatrix} Y \\ Cb \\ Cr \end{pmatrix}$$

FIG. 12D $$\begin{pmatrix} Y \\ Cb \\ Cr \end{pmatrix} = \begin{pmatrix} 0.0625 & 0.875 & 0.0625 \\ -0.0625 & -0.875 & 0.9375 \\ 0.9375 & -0.875 & -0.0625 \end{pmatrix} \begin{pmatrix} R \\ G \\ B \end{pmatrix}$$

$$\begin{pmatrix} R \\ G \\ B \end{pmatrix} = \begin{pmatrix} 1.0 & 0 & 1.0 \\ 1.0 & -0.071429 & -0.071429 \\ 1.0 & 1.0 & 0 \end{pmatrix} \begin{pmatrix} Y \\ Cb \\ Cr \end{pmatrix}$$

FIG. 12E $$\begin{pmatrix} Y \\ Cb \\ Cr \end{pmatrix} = \begin{pmatrix} 0.0 & 1.0 & 0.0 \\ 0.0 & -1.0 & 1.0 \\ 1.0 & -1.0 & 0.0 \end{pmatrix} \begin{pmatrix} R \\ G \\ B \end{pmatrix}$$

$$\begin{pmatrix} R \\ G \\ B \end{pmatrix} = \begin{pmatrix} 1.0 & 0 & 1.0 \\ 1.0 & 0 & 0 \\ 1.0 & 1.0 & 0 \end{pmatrix} \begin{pmatrix} Y \\ Cb \\ Cr \end{pmatrix}$$

FIG. 14

|  | MINIMUM VALUE | MAXIMUM VALUE | $\alpha$ |
|---|---|---|---|
| RANGE OF R/G | 0 | 1.125 | 0 |
|  | 1.125 | 1.375 | 0.0625 |
|  | 1.375 | 1.625 | 0.125 |
|  | 1.625 | 1.875 | 0.1875 |
|  | 1.875 |  | 0.25 |

FIG. 15

|  | MINIMUM VALUE | MAXIMUM VALUE | $\beta$ |
|---|---|---|---|
| RANGE OF B/G | 0 | 1.125 | 0 |
|  | 1.125 | 1.375 | 0.0625 |
|  | 1.375 | 1.625 | 0.125 |
|  | 1.625 | 1.875 | 0.1875 |
|  | 1.875 |  | 0.25 |

IMAGE PROCESSING METHOD, IMAGE PROCESSING DEVICE, SEMICONDUCTOR DEVICE, ELECTRONIC APPARATUS, IMAGE PROCESSING PROGRAM, AND COMPUTER-READABLE STORAGE MEDIUM

RELATED APPLICATIONS

This application claims priority to Japanese Patent Application Nos. 2004-039799 filed Feb. 13, 2004 and 2004-292364 filed Oct. 5, 2004 which are hereby expressly incorporated by reference herein in their entirety.

BACKGROUND

1. Technical Field

The present invention relates to an image processing device used for a digital camera equipped with a color image capturing device, such as a CCD or a CMOS, and more particularly to an image processing method, an image processing device, a semiconductor device, an electronic apparatus, an image processing program, and a computer-readable storage medium, capable of removing pseudo colors generated by a color interpolation process.

2. Related Art

In general, digital cameras, such as digital video cameras and digital still cameras, are mainly classified into a three-chip digital camera using three image capturing sensors, such as CCDs (Charge Coupled Devices) and CMOSs (Complementary Metal Oxide Semiconductors), and a single-chip digital camera using only one image capturing sensor.

In the three-chip digital camera, incident light is divided into the three primary colors of red (R), green (G), and blue (B) by dichroic mirrors, and the divided color components are respectively converted into R, G, and B digital images by three image capturing sensors. Therefore, since the three-chip digital camera has a complicated optical system structure, but can obtain high-resolution images, the three-chip type is generally used for digital video cameras for business purposes and high-quality digital camera.

On the other hand, the single-chip digital camera has color filters in which R, G, and B color pixels are arranged on one image capturing sensor in a block shape, and converts light information passing through color filters corresponding to each pixel into digital data. Therefore, the single-chip digital camera has resolution lower then that of the three-chip digital camera, but has a small size, a light weight, low power consumption, and a low manufacturing cost, compared to the three-chip digital camera. Therefore, the single-chip type is mainly used for consumer digital video cameras and digital still cameras.

Further, in recent years, the consumer color video cameras using the three-chip type have been produced. In addition, a two-chip type digital camera using two image capturing sensors has been proposed, and the two-chip type has an intermediate character between these two types, but it has not been used in recent years. The single-chip digital camera requires a color interpolation process for forecast-interpolating lost color components. However, since the color interpolation process, which will be described in detail, is to create color data that does not exist in a target pixel from values of pixels around the target pixel by a supposing method, it is difficult to exactly calculate pixel values at a portion of an image, such as an edge portion, in which a pixel value is suddenly changed. Therefore, an image having a color balance different from a conventional color balance occurs in the edge portion in which an exact pixel value is not obtained, and the image appears to be a pseudo color, which causes an unclear image or the deterioration of image quality.

Therefore, in the conventional arts, as described in Japanese Unexamined Patent Application Publication No. 2003-244711, RGB data obtained by a simple color interpolation process is converted into a brightness signal Y and a color-difference signal C, and a high-pass enhancement filtering process or a low-pass enhancement filtering process is performed on the respective signals to improve image characteristics.

Meanwhile, Japanese Unexamined Patent Application Publication No. 2002-10280 and 2001-231052 disclose a color interpolating method capable of preventing the lowering of image quality, such as the generation of a pseudo color and an unclear image, by adaptively performing color interpolation using wide-area image data.

Further, in a method of Japanese Unexamined Patent Application Publication No. 2003-244711 out of the conventional arts, a transformation formula for converting the RGB data obtained by the color interpolation process into the brightness signal Y and the color-difference signal C is fixed. Therefore, when a value of a specific color in a pixel unit to be process (for example, a pixel unit having 2 rows by 2 columns of pixels or a pixel unit having 3 rows by 3 columns of pixels) is large at the time of simple color interpolation, the overall resolution of an image is greatly affected by the resolution of the color having a large value, which results in the lowering of the overall resolution.

For example, in the case in which the color interpolation process is performed in a pixel unit having 2 rows by 2 columns of pixels composed of an R pixel, a B pixel, and two G pixels, when a value of the R pixel is extremely large, the color interpolation process is performed under the influence of the R pixel (or the B pixel), so that an image is generated with the resolution of the R pixel. As a result, an image is displayed with lower resolution corresponding to half the resolution obtained by the conventional sensor.

Meanwhile, Japanese Unexamined Patent Application Publication No. 2001-231052 requires a plurality of line memories since it performs the color interpolation process using wide-area image data and needs to perform the process with complicated calculation. Therefore, there is a problem in that a processing load may increase as a whole. In addition, in an RGB mosaic arrangement, color interpolation is performed on G using the correlation between pixels, and a pixel to be used is determined using the correlation of G data with respect to R and B. Therefore, when a switching point of processing is frequently generated at an edge portion of an image, it is difficult to reproduce a smooth edge.

Further, in both conventional techniques, a specific color is exactly calculated, and then the other colors are calculated. Therefore, an additional calculation process for the other colors is needed, which causes an increase in processing load.

Accordingly, the present invention is designed to solve the above-mentioned problems, and it is an object of the present invention to provide an image processing method, an image processing device, a semiconductor device, an electronic apparatus, an image processing program and a computer-readable storage medium, capable of reducing an image processing load, of preventing the lowering of resolution, and of reliably reproducing a smooth and natural edge of an image.

SUMMARY

In order to achieve the above-mentioned object, according to the first aspect, the present invention provides an image processing method comprising: a step of performing a color interpolation process on single-color pixel data for a pixel output from a single-chip color image capturing sensor to calculate color data for each pixel; and a step of converting the color data into a brightness signal Y and a color-difference signal C using a predetermined transformation formula and of performing a predetermined filtering process on the respective signals, in which the transformation formula is replaced based on each color value of the color data.

That is, as described above, in the case in which the transformation formula for converting the color data obtained by performing the color interpolating process on the pixel data output from the single-chip color image capturing sensor in the brightness signal Y and the color-difference signal C is fixed, when a value of 'R' or 'B' as well as a value of one pixel in a pixel unit to be processed at the time of simple color interpolation is large, the overall resolution of an image is greatly affected by the resolution of the color, which results in the lowering of the overall resolution.

However, in the present invention, the transformation formula for converting the color data subjected to the color interpolation process into the brightness signal Y and the color-difference signal C is actively changed based on each color value of the color data.

Therefore, when a value of a specific color is large, it is possible to change the (YC) transformation formula to minimize the influence of the color. Thus, the overall resolution of an image is greatly affected by the specific color, so that it is possible to prevent the lowering of the overall resolution.

Further, it is possible to use the conventional simple color interpolation process as it is without adding other processes to the color interpolation process. Therefore, it is possible to reliably reproduce a smooth and natural edge, and an increase in image processing load does not occur.

In the present invention, the 'color data' includes color data obtained by a three-color filter (generally referred to as a primary color filter) constructed by arranging 'R', 'G', and 'B' filters in each pixel, color data obtained by a four-color filter (generally referred to as a complementary color filter) constructed by arranging 'C (cyan)', 'M (magenta)', 'Y (yellow)' and 'G (green)' filters in each pixel, and color data obtained by a three color filter (R, G, B) constructed by adding a purple color filter to the primary color filter (which is similarly applied to the following 'image processing method', 'image processing device', 'image processing program', 'electronic apparatus', and 'computer-readable storage medium having the image processing program thereon' as long as it is not particularly mentioned).

Further, in the present invention, the term 'Y' does not exactly means brightness and represents control parameters for determining resolution with respect to the data obtained by the color interpolation. In general, these parameters are brightness signals, and in the present invention these are similar but not exactly the same as conventional brightness. That is, a signal having spatial position information as priority is called brightness, and the signal is not used to exactly calculate a brightness signal between color spaces (which is similarly applied to the following 'image processing method', 'image processing device', 'image processing program', 'electronic apparatus', and 'computer-readable storage medium having the image processing program thereon' as long as it is not particularly mentioned).

According to the second aspect of the present invention, in the image processing method according to the first aspect, predetermined values prepared in advance are used as coefficients of the transformation formula.

That is, when a free coefficient is used as the coefficient for the (YC) transformation formula, it is necessary to provide a multiplier in a hardware structure, which results in the waste of a hardware resource. Therefore, when predetermined values obtained in advance, for example, values obtained by multiplying '0.125', '0.25', '0.5', '0.725', and '1.0', by 2n (where n is an integer) and coefficients similar to these values are the coefficients for the transformation formula of the present invention, it is possible to greatly save the hardware resource. In addition, in consideration of a hardware structure, it is possible to realize a calculation process faster than a multiply process. In addition, coefficients to be used for an embodiment, which will be described later, are generated in the above-mentioned range, and a satisfactory result is obtained from an experiment under the conditions.

An image processing method of the third aspect comprises: a step of performing a color interpolation process on single-color pixel data for a pixel output from a single-chip color image capturing sensor to calculate color data for each pixel; a step of converting the color data into a brightness signal Y and a color-difference signal C using a predetermined transformation formula; a step of performing a predetermined filtering process on the respective signals; a step of detecting a maximum value from the color data calculated by the color interpolation process performed on each pixel; a step of calculating a ratio of the maximum value to a value of a specific color; and a step of determining the transformation formula based on the ratio.

That is, as will be described later, in the transformation formula used in the conventional YC converting process, each coefficient is fixed. For example, when the value of 'R' or 'B' is large, the overall resolution is greatly affected by the color, which results in the lowering of the overall resolution.

Therefore, in the present invention, a color having the maximum value is detected from the colors of the color data, and a ratio of the maximum value to values of the other colors so as for brightness data not to be greatly affected by the color. Then, the transformation formula is determined based on the ratio.

Similar to the first aspect of the present invention, when a value of a specific color is large, it is possible to determine a transformation formula such that a contribution ratio of the generated brightness data on the specific color is reduced to decrease the influence of the color. Therefore, it is possible to prevent the overall resolution from being affected by the resolution of the color and thus to prevent the lowering of the overall resolution.

Further, it is possible to use the conventional simple color interpolation process as it is without adding other processes to the color interpolation process. Therefore, it is possible to reliably reproduce a smooth and natural edge, and an increase in image processing load does not occur.

An image processing method of the fourth aspect comprises: a step of performing a color interpolation process on single-color pixel data for a pixel output from a single-chip color image capturing sensor in a pixel unit having 2 rows by 2 columns of pixels in which an R pixel having a red filter and a B pixel having a blue filter are arranged, in a pixel unit having 3 rows by 3 columns of pixels in which the R pixel or the B pixel is located at the center thereof and the other color pixels are arranged around the center, or in a pixel unit having 3 rows by 3 columns of pixels in which two R pixels and two B pixels are arranged; a step of converting the color data into a brightness signal Y and a color-difference signal C using a predetermined transformation formula; and a step of performing a predetermined filtering process on the respective signals, wherein, in the transformation formula, the brightness signal Y is calculated by the following expression:

R×K1+G×K2+B×K1 (where K1+K2+K1=1.0), wherein the color-difference signal C(Cb, Cr) is calculated by the difference between R and Y and the difference between B and Y, and wherein values of K1 and K2 are changed based on values of RGB colors of the color data calculated by the color interpolation process.

In this way, similar to the first and second aspects, it is possible to prevent the lowering of resolution and an increase in an image processing load, and it is possible to determine a transformation formula only by manipulating a parameter 'K1' or 'K2' in the pixel unit having 2 rows by 2 columns of pixels or the pixel unit having 3 rows by 3 columns of pixels. Therefore, it is possible to easily determine an appropriate transformation formula.

Further, as will be described later, color filters of the single-chip color image capturing sensor are aligned in a mosaic arrangement in which the pixel unit having 2 rows by 2 columns of pixels is repeatedly arranged. In addition, in case of three colors of R, G, and B, a G pixel is arranged in an island shape in the pixel unit having 2 rows by 2 columns of pixels, and when purple is added to the three colors, or when four colors of C, M, Y, and G are used, the four colors are generally arranged in the pixel unit having 2 rows by 2 columns of pixels, respectively.

An image processing method of the fifth aspect comprises: a step of performing a color interpolation process on single-color pixel data for a pixel output from a single-chip color image capturing sensor to calculate color data for each pixel; a step of converting the color data into a brightness signal Y and a color-difference signal C using a predetermined transformation formula; and a step of performing a predetermined filtering process on the respective signals, wherein there are two or more types of transformation formulas, and the transformation formula is selected from a plurality of the transformation formulas based on each color value of the color data.

That is, in the conventional arts, the fixed transformation formula is appropriately changed based on the color data. However, in the first to fourth aspects of the present invention, two or more types of transformation formulas are previously prepared, and the optimum transformation formula is selected from the plurality of transformation formulas.

In this way, it is possible to obtain the same effects as those in the first aspect of the present invention, and it is also possible to realize a high-speed YC converting process, compared to a case in which a transformation formula is replaced for one pixel.

According to the sixth aspect of the present invention, in the image processing method according to the fifth aspect, the color interpolation process is performed on each pixel of the single-chip color image capturing sensor in a pixel unit having 2 rows by 2 columns of pixels in which an R pixel having a red filter and a B pixel having a blue filter are arranged, in a pixel unit having 3 rows by 3 columns of pixels in which the R pixel or the B pixel is located at the center thereof and the other color pixels are arranged around the center, or in a pixel unit having 3 rows by 3 columns of pixels in which two R pixels and two B pixels are arranged, and the transformation formula is switched according to a value of the R pixel or the B pixel and a value of the other pixel.

In this way, it is possible to effectively prevent the lowering of resolution generated by a so-called simple color interpolation process performed in the pixel unit of 2 rows by 2 columns of pixels or in the pixel unit of 3 rows by 3 columns of pixels.

An image processing method of the seventh aspect comprises: a step of performing a color interpolation process on single-color pixel data for a pixel output from a single-chip color image capturing sensor to calculate color data for each pixel; a step of separately converting the color data into a brightness signal Y and a color-difference signal C using two or more types of transformation formulas; a step of synthesizing the brightness signals Y and of synthesizing the color-difference signals C using a predetermined coefficient; and a step of performing a predetermined filtering process on the synthesized brightness signal Y and the synthesized color-difference signal C, respectively.

That is, in the first to sixth aspects, one transformation formula is used for one color data to perform the YC conversion. However, in the present aspect, one color data is separately YC-converted into the brightness signal Y and the color-difference signal C using two or more types of transformation formulas, and the brightness signals Y and the color-difference signals C are respectively synthesized using predetermined coefficients. Then, the filtering process is performed on the synthesized brightness signal Y and color-difference signal C.

In this way, it is possible to obtain the same effects as those in the first aspect, and it is also possible to determine multiple types of transformation formulas by changing only one transformation formula, similar to the fourth aspect. Therefore, it is possible to easily determine an appropriate transformation formula.

An image processing method of the eighth aspect comprises: a step of performing a color interpolation process on single-color pixel data for a pixel output from a single-chip color image capturing sensor to calculate color data for each pixel; a step of separately converting the color data into a brightness signal Y and a color-difference signal C using two or more types of transformation formulas; a step of performing a predetermined filtering process on the respective signals; a step of inverting the brightness signal Y and the color-difference signal C filtered by the filtering process into the color data; and a step of synthesizing the respective color data inverted by the inverting process using a predetermined coefficient.

That is, in the sixth aspect, one color data is separately YC-converted into the brightness signal Y and the color-difference signal C using two or more types of transformation formulas, and the brightness signals Y and the color-difference signals C are respectively synthesized using predetermined coefficients. Then, the filtering process is performed on the synthesized brightness signal Y and color-difference signal C. However, in the present aspect, one color data is separately YC-converted into the brightness signal Y and the color-difference signal C using two or more types of transformation formulas, and a predetermined filtering process is performed on the respective signals. Then, the brightness signal Y and the color-difference signal C are inverted into the respective color data, and the respective color data subjected to the inverting process are synthesized using a predetermined coefficient.

In this way, it is possible to obtain the same effects as those in the first aspect, and it is also possible to process various patterns by changing the synthesis ratio, without preparing a plurality of transformation formulas in advance.

According to the ninth aspect of the present invention, in the image processing method according to the seventh or eighth aspect, the color interpolation process is performed on each pixel of the single-chip color image capturing sensor in a pixel unit having 2 rows by 2 columns of pixels in which an R pixel having a red filter and a B pixel having a blue filter are arranged, in a pixel unit having 3 rows by 3 columns of pixels in which the R pixel or the B pixel is located at the center thereof and the other color pixels are arranged around the center, or in a pixel unit having 3 rows by 3 columns of pixels in which two R pixels and two B pixels are arranged.

In this way, it is possible to effectively prevent the lowering of resolution generated by a so-called simple color interpolation process performed in the pixel unit of 2 rows by 2 columns of pixels or in the pixel unit of 3 rows by 3 columns of pixels with a small number of transformation formulas.

An image processing device of the tenth aspect comprises: a color interpolation processing unit for performing a color interpolation process on single-color pixel data for a pixel output from a single-chip color image capturing sensor to calculate color data for each pixel; a YC converting unit for converting the color data calculated by the color interpolation processing unit into a brightness signal Y and a color-difference signal C using a predetermined transformation formula; and a filtering unit for performing a predetermined filtering process on the brightness signal Y and the color-difference signal C converted by the YC converting unit, wherein the YC converting unit replaces the transformation formula based on each color value of the color data.

In this way, similar to the first aspect, when the value of a specific color is large, it is possible to replace the transformation formula to reduce the influence of the color. Therefore, the overall resolution is not greatly affected by the resolution of the color, and thus it is possible to prevent the lowering of the overall resolution.

Further, it is possible to use the conventional simple color interpolation process as it is without adding other processes to the color interpolation process. Therefore, it is possible to reliably reproduce a smooth and natural edge, and an increase in image processing load does not occur.

According to the eleventh aspect of the present invention, in the image processing device according to the tenth aspect, predetermined values prepared in advance are used as coefficients of the transformation formula.

In this way, similar to the second aspect, it is possible to greatly save a hardware resource. In addition, in consideration of a hardware structure, it is possible to perform a calculation process at a speed higher than a multiply process.

An image processing device of the twelfth aspect comprises: a color interpolation processing unit for performing a color interpolation process on single-color pixel data for a pixel output from a single-chip color image capturing sensor to calculate color data for each pixel; a YC converting unit for converting the color data calculated by the color interpolation processing unit into a brightness signal Y and a color-difference signal C using a predetermined transformation formula; and a filtering unit for performing a predetermined filtering process on the brightness signal Y and the color-difference signal C converted by the YC converting unit, wherein the YC converting unit detects a color having the maximum value from colors of the color data calculated by the color interpolation process to calculate a ratio of the maximum value to values of other colors and determines the transformation formula based on the ratio.

In this way, similar to the first aspect, it is possible to prevent the lowering of resolution, and it is possible to use the conventional simple color interpolation process as it is without adding other processes to the color interpolation process. Therefore, it is possible to reliably reproduce a smooth and natural edge, and an increase in image processing load does not occur.

An image processing device of the thirteenth aspect comprises: a color interpolation processing unit for performing a color interpolation process on single-color pixel data for a pixel output from a single-chip color image capturing sensor in a pixel unit having 2 rows by 2 columns of pixels in which an R pixel having a red filter and a B pixel having a blue filter are arranged, in a pixel unit having 3 rows by 3 columns of pixels in which the R pixel or the B pixel is located at the center thereof and the other color pixels are arranged around the center, or in a pixel unit having 3 rows by 3 columns of pixels in which two R pixels and two B pixels are arranged, to calculate RGB data for each pixel; a YC converting unit for converting the RGB data calculated by the color interpolation processing unit into a brightness signal Y and a color-difference signal C using a predetermined transformation formula; and a filtering unit for performing a predetermined filtering process on the brightness signal Y and the color-difference signal C converted by the YC converting unit, wherein, in the transformation formula, the YC converting unit calculates the brightness signal Y based on the following expression:

R×K1+G×K2+B×K1 (where K1+K2+K1=1.0), wherein the color-difference signal C(Cb, Cr) is calculated by the difference between R and Y and the difference between B and Y, and wherein values of K1 and K2 are changed based on values of colors of the RGB data calculated by the color interpolation process.

In this way, similar to the first aspect, it is possible to prevent the lowering of resolution and an increase in an image processing load, and it is possible to determine a transformation formula only by manipulating a parameter 'K1' or 'K2' in the pixel unit having 2 rows by 2 columns of pixels or in the pixel unit having 3 rows by 3 columns of pixels. Therefore, it is possible to easily determine an appropriate transformation formula.

An image processing device of the fourteenth aspect comprises: a color interpolation processing unit for performing a color interpolation process on single-color pixel data for a pixel output from a single-chip color image capturing sensor to calculate color data for each pixel; a YC converting unit for converting the color data calculated by the color interpolation processing unit into a brightness signal Y and a color-difference signal C using a predetermined transformation formula; and a filtering unit for performing a predetermined filtering process on the brightness signal Y and the color-difference signal C converted by the YC converting unit, respectively, wherein the YC converting unit has two or more types of transformation formulas and replaces the transformation formula based on each color value of the color data.

In this way, it is possible to obtain the same effects as those in the first aspect, and it is also possible to realize a high-speed YC transformation process, compared to a method in which one transformation formula is replaced for one pixel.

According to the fifteenth aspect of the present invention, in the image processing device according to the fourteenth aspect, the color interpolation process in the color interpolation processing unit is performed on each pixel of the single-chip color image capturing sensor in a pixel unit having 2 rows by 2 columns of pixels in which an R pixel having a red filter and a B pixel having a blue filter are arranged, in a pixel unit having 3 rows by 3 columns of pixels in which the R pixel or the B pixel is located at the center thereof and the other color pixels are arranged around the center, or in a pixel unit having 3 rows by 3 columns of pixels in which two R pixels and two B pixels are arranged, wherein the transformation formula is replaced according to a value of the R pixel or the B pixel.

In this way, it is possible to effectively prevent the lowering of resolution generated by a so-called simple color interpolation process performed in the pixel unit of 2 rows by 2 columns of pixels or in the pixel unit of 3 rows by 3 columns of pixels.

An image processing device of the sixteenth aspect comprises: a color interpolation processing unit for performing a color interpolation process on single-color pixel data for a pixel output from a single-chip color image capturing sensor to calculate color data for each pixel; a YC converting unit for separately converting the color data calculated by the color interpolation processing unit into a brightness signal Y and a color-difference signal C using two or more types of transformation formulas and for respectively synthesizing the brightness signals Y and the color-difference signals C using a predetermined coefficient; and a filtering unit for performing a predetermined filtering process on the brightness signal Y and the color-difference signal C synthesized by the YC converting unit.

In this way, it is possible to obtain the same effects as those in the first aspect, and it is also possible to determine multiple types of transformation formulas by changing only one transformation formula, similar to the fourth aspect. Therefore, it is possible to easily determine an appropriate transformation formula.

An image processing device of the seventeenth aspect comprises: a color interpolation processing unit for performing a color interpolation process on single-color pixel data for a pixel output from a single-chip color image capturing sensor to calculate color data for each pixel; a YC converting unit for separately converting the color data calculated by the color interpolation processing unit into a brightness signal Y and a color-difference signal C using different transformation formulas; a filtering unit for performing a predetermined filtering process on the brightness signals Y and the color-difference signals C converted by the YC converting unit; an inverting unit for separately inverting the brightness signals Y and the color-difference signals C filtered by the filtering unit into the color data; and a data synthesizing unit for synthesizing the color data inverted by the inverting unit using a predetermined coefficient.

In this way, it is possible to obtain the same effects as those in the first aspect, and it is also possible to provide various patterns only by changing the mixture ratio, without preparing a plurality of transformation formulas in advance.

According to the eighteenth aspect of the present invention, in the image processing device according to the sixteenth or seventeenth aspect, the color interpolation process in the color interpolation processing unit is performed on each pixel of the single-chip color image capturing sensor in a pixel unit having 2 rows by 2 columns of pixels in which an R pixel having a red filter and a B pixel having a blue filter are arranged, in a pixel unit having 3 rows by 3 columns of pixels in which the R pixel or the B pixel is located at the center thereof and the other color pixels are arranged around the center, or in a pixel unit having 3 rows by 3 columns of pixels in which two R pixels and two B pixels are arranged.

In this way, it is possible to effectively prevent the lowering of resolution generated by a so-called simple color interpolation process performed in the pixel unit of 2 rows by 2 columns of pixels or in the pixel unit of 3 rows by 3 columns of pixels with a small number of transformation formulas.

A semiconductor device of the nineteenth aspect comprises: a color interpolation processing unit for performing a color interpolation process on single-color pixel data for a pixel output from a single-chip color image capturing sensor to calculate color data for each pixel; a YC converting unit for converting the color data calculated by the color interpolation processing unit into a brightness signal Y and a color-difference signal C using a predetermined transformation formula; and a filtering unit for performing a predetermined filtering process on the brightness signal Y and the color-difference signal C converted by the YC converting unit, wherein the YC converting unit replaces the transformation formula based on each color value of the color data.

In this way, it is possible to obtain the same effects as those in the first or tenth aspect, and it is also possible to provide the device in the form of a single-chip element, such as ASIC (Application Specific Integrated Circuit). Therefore, the device can be easily mounted in small digital video cameras or digital still cameras.

According to the twentieth aspect of the present invention, in the semiconductor device according to the nineteenth aspect, predetermined values prepared in advance are used as coefficients of the transformation formula.

In this way, it is possible to obtain the same effects as those in the second or eleventh aspect, and it is also possible to provide the device in the form of a single-chip element, such as ASIC, similar to the nineteenth aspect. Therefore, the device can be easily mounted in small digital video cameras or digital still cameras.

A semiconductor device of the twenty-first aspect comprises: a color interpolation processing unit for performing a color interpolation process on single-color pixel data for a pixel output from a single-chip color image capturing sensor to calculate color data for each pixel; a YC converting unit for converting the color data calculated by the color interpolation processing unit into a brightness signal Y and a color-difference signal C using a predetermined transformation formula; and a filtering unit for performing a predetermined filtering process on the brightness signal Y and the color-difference signal C converted by the YC converting unit, wherein the YC converting unit detects a color having the maximum value from colors of the color data calculated by the color interpolation process to calculate a ratio of the maximum value to values of other colors and determines the transformation formula based on the ratio.

In this way, it is possible to obtain the same effects as those in the first or twelfth aspect, and it is also possible to provide the device in the form of a single-chip element, such as ASIC, similar to the nineteenth aspect. Therefore, the device can be easily mounted in small digital video cameras or digital still cameras.

A semiconductor device of the twenty-second aspect comprises: a color interpolation processing unit for performing a color interpolation process on single-color pixel data for a pixel output from a single-chip color image capturing sensor in a pixel unit having 2 rows by 2 columns of pixels in which an R pixel having a red filter and a B pixel having a blue filter are arranged, in a pixel unit having 3 rows by 3 columns of pixels in which the R pixel or the B pixel is located at the center thereof and the other color pixels are arranged around the center, or in a pixel unit having 3 rows by 3 columns of pixels in which two R pixels and two B pixels are arranged, to calculate RGB data for each pixel; a YC converting unit for converting the RGB data calculated by the color interpolation processing unit into a brightness signal Y and a color-difference signal C using a predetermined transformation formula; and a filtering unit for performing a predetermined filtering process on the brightness signal Y and the color-difference signal C converted by the YC converting unit, wherein, in the transformation formula, the YC converting unit calculates the brightness signal Y based on the following expression:

R×K1+G×K2+B×K1 (where K1+K2+K1=1.0), wherein the color-difference signal C(Cb, Cr) is calculated by the difference between R and Y and the difference between B and Y, and wherein values of K1 and K2 are changed based on values of colors of the RGB data calculated by the color interpolation process.

In this way, it is possible to obtain the same effects as those in the first or fourteenth aspect, and it is also possible to provide the device in the form of a single-chip element, such as ASIC, similar to the nineteenth aspect. Therefore, the device can be easily mounted in small digital video cameras or digital still cameras.

A semiconductor device of the twenty-third aspect comprises: a color interpolation processing unit for performing a color interpolation process on single-color pixel data for a pixel output from a single-chip color image capturing sensor to calculate color data for each pixel; a YC converting unit for converting the color data calculated by the color interpolation processing unit into a brightness signal Y and a color-difference signal C using a predetermined transformation formula; and a filtering unit for performing a predetermined filtering process on the brightness signal Y and the color-difference signal C converted by the YC converting unit, wherein the YC converting unit has two or more types of transformation formulas and replaces the transformation formula based on each color value of the color data.

In this way, it is possible to obtain the same effects as those in the first or fifteenth aspect, and it is also possible to provide the device in the form of a single-chip element, such as ASIC, similar to the nineteenth aspect. Therefore, the device can be easily mounted in small digital video cameras or digital still cameras.

According to the twenty-fourth aspect of the present invention, in the semiconductor device according to the twenty-third aspect, the color interpolation process in the color interpolation processing unit is performed on each pixel of the single-chip color image capturing sensor in a pixel unit having 2 rows by 2 columns of pixels in which an R pixel having a red filter and a B pixel having a blue filter are arranged, in a pixel unit having 3 rows by 3 columns of pixels in which the R pixel or the B pixel is located at the center thereof and the other color pixels are arranged around the center, or in a pixel unit having 3 rows by 3 columns of pixels in which two R pixels and two B pixels are arranged, and wherein the transformation formula is replaced according to a value of the R pixel or the B pixel.

In this way, it is possible to obtain the same effects as those in the sixteenth aspect, and it is also possible to provide the device in the form of a single-chip element, such as ASIC, similar to the nineteenth aspect. Therefore, the device can be easily mounted in small digital video cameras or digital still cameras.

A semiconductor device of the twenty-fifth aspect comprises: a color interpolation processing unit for performing a color interpolation process on single-color pixel data for a pixel output from a single-chip color image capturing sensor to calculate color data for each pixel; a YC converting unit for separately converting the color data calculated by the color interpolation processing unit into a brightness signal Y and a color-difference signal C using two or more types of transformation formulas and for respectively synthesizing the brightness signals Y and the color-difference signals C using a predetermined coefficient; and a filtering unit for performing a predetermined filtering process on the brightness signal Y and the color-difference signal C synthesized by the YC converting unit.

In this way, it is possible to obtain the same effects as those in the first or sixteenth aspect, and it is also possible to provide the device in the form of a single-chip element, such as ASIC, similar to the nineteenth aspect. Therefore, the device can be easily mounted in small digital video cameras or digital still cameras.

A semiconductor device of the twenty-sixth aspect comprises: a color interpolation processing unit for performing a color interpolation process on single-color pixel data for a pixel output from a single-chip color image capturing sensor to calculate color data for each pixel; a YC converting unit for separately converting the color data calculated by the color interpolation processing unit into a brightness signal Y and a color-difference signal C using different transformation formulas; a filtering unit for performing a predetermined filtering process on the brightness signals Y and the color-difference signals C respectively converted by the YC converting unit; an inverting unit for separately inverting the brightness signals Y and the color-difference signals C filtered by the filtering unit into the respective color data; and a data synthesizing unit for synthesizing the respective color data inverted by the inverting unit using predetermined coefficients.

In this way, it is possible to obtain the same effects as those in the first or seventeenth aspect, and it is also possible to provide the device in the form of a single-chip element, such as ASIC, similar to the nineteenth aspect. Therefore, the device can be easily mounted in small digital video cameras or digital still cameras.

According to the twenty-seventh aspect of the present invention, in the semiconductor device according to the twenty-fifth or twenty-sixth aspect, the color interpolation process in the color interpolation processing unit is performed on each pixel of the single-chip color image capturing sensor in a pixel unit having 2 rows by 2 columns of pixels in which an R pixel having a red filter and a B pixel having a blue filter are arranged, in a pixel unit having 3 rows by 3 columns of pixels in which the R pixel or the B pixel is located at the center thereof and the other color pixels are arranged around the center, or in a pixel unit having 3 rows by 3 columns of pixels in which two R pixels and two B pixels are arranged.

In this way, it is possible to obtain the same effects as those in the eighteenth aspect, and it is also possible to provide the device in the form of a single-chip element, such as ASIC, similar to the nineteenth aspect. Therefore, the device can be easily mounted in small digital video cameras or digital still cameras.

An electronic apparatus of the twenty-eighth aspect comprises the image processing device according to any one of the tenth to eighteenth aspects.

In this way, it is possible to provide an electronic apparatus capable of processing images at high speed and displaying a high-quality image without lowering resolution.

The electronic apparatus of the present invention is not just limited to apparatuses for processing digital images, but includes digital video cameras, digital still cameras, digital movie cameras, cameras built in mobile phones, Web cameras, security cameras, and network cameras.

An electronic apparatus of the twenty-ninth aspect comprises the semiconductor device according to any one of the nineteenth to twenty-seventh aspects.

In this way, it is possible to provide an electronic apparatus capable of processing images at high speed and displaying a high-quality image without lowering resolution.

An image processing program of the thirtieth aspect allows a computer to function as: color interpolating means for performing a color interpolation process on single-color pixel data for a pixel output from a single-chip color image capturing sensor to calculate color data for each pixel; YC converting means for converting the color data calculated by the color interpolating means into a brightness signal Y and a color-difference signal C using a predetermined transformation formula; and filtering means for performing a predetermined filtering process on the brightness signal Y and the color-difference signal C converted by the YC converting means, wherein the YC converting means replaces the transformation formula based on each color value of the color data.

In this way, similar to the first aspect, it is possible to prevent the lowering of resolution, and it is also possible to reliably reproduce a smooth and natural edge without increasing an image processing load.

Further, it is possible to allow a general-purpose computer system, such as a personal computer (PC), as well as a dedicated computer system to execute software. Therefore, it is possible to economically and easily realize the functions of the program. In addition, it is possible to easily change the functions of the program only by rewriting the program.

According to the thirty-first aspect of the present invention, in the image processing program according to the thirtieth aspect, predetermined values prepared in advance are used as coefficients of the transformation formula.

In this way, similar to the second aspect, it is possible to greatly save a hardware resource. In addition, in consideration of a hardware structure, it is possible to perform a calculation process at a speed higher than a multiply process.

An image processing program of the thirty-second aspect allows a computer to function as: a color interpolation processing unit for performing a color interpolation process on single-color pixel data for a pixel output from a single-chip color image capturing sensor to calculate color data for each pixel; a YC converting unit for converting the color data calculated by the color interpolation processing unit into a brightness signal Y and a color-difference signal C using a predetermined transformation formula; and a filtering unit for performing a predetermined filtering process on the brightness signal Y and the color-difference signal C converted by the YC converting unit, wherein the YC converting unit detects a color having the maximum value from colors of the color data calculated by the color interpolation process to calculate a ratio of the maximum value to values of other colors and determines the transformation formula based on the ratio.

In this way, it is possible to obtain the same effects as those in the third aspect, and it is also possible to allow a general-purpose computer system, such as a personal computer (PC), as well as a dedicated computer system to execute software, similar to the twenty-first aspect. Therefore, it is possible to economically and easily realize the functions of the program. In addition, it is possible to easily change the functions of the program only by rewriting the program.

An image processing program of the thirty-third aspect allows a computer to function as: a color interpolation processing unit for performing a color interpolation process on single-color pixel data for a pixel output from a single-chip color image capturing sensor in a pixel unit having 2 rows by 2 columns of pixels in which an R pixel having a red filter and a B pixel having a blue filter are arranged, in a pixel unit having 3 rows by 3 columns of pixels in which the R pixel or the B pixel is located at the center thereof and the other color pixels are arranged around the center, or in a pixel unit having 3 rows by 3 columns of pixels in which two R pixels and two B pixels are arranged, to calculate RGB data for each pixel; a YC converting unit for converting the RGB data calculated by the color interpolation processing unit into a brightness signal Y and a color-difference signal C using a predetermined transformation formula; and a filtering unit for performing a predetermined filtering process on the brightness signal Y and the color-difference signal C converted by the YC converting unit, wherein, in the transformation formula, the YC converting unit calculates the brightness signal Y based on the following expression:

$R \times K1 + G \times K2 + B \times K1$ (where $K1+K2+K1=1.0$), wherein the color-difference signal $C(Cb, Cr)$ is calculated by the difference between R and Y and the difference between B and Y, and wherein values of K1 and K2 are changed based on values of colors of the RGB data calculated by the color interpolation process.

In this way, it is possible to obtain the same effects as those in the fourth aspect, and it is also possible to allow a general-purpose computer system, such as a personal computer (PC), as well as a dedicated computer system to execute software, similar to the twenty-first aspect. Therefore, it is possible to economically and easily realize the functions of the program. In addition, it is possible to easily change the functions of the program only by rewriting the program.

An image processing program of the thirty-fourth aspect allows a computer to function as: color interpolating means for performing a color interpolation process on single-color pixel data for a pixel output from a single-chip color image capturing sensor to calculate color data for each pixel; YC converting means for converting the color data calculated by the color interpolating means into a brightness signal Y and a color-difference signal C using a predetermined transformation formula; and filtering means for performing a predetermined filtering process on the brightness signal Y and the color-difference signal C converted by the YC converting means, wherein the YC converting means has two or more types of transformation formulas and replaces the transformation formula based on each color value of the color data.

In this way, it is possible to obtain the same effects as those in the fifth aspect, and it is also possible to allow a general-purpose computer system, such as a personal computer (PC), as well as a dedicated computer system to execute software, similar to the twenty-first aspect. Therefore, it is possible to economically and easily realize the functions of the program. In addition, it is possible to easily change the functions of the program only by rewriting the program.

According to the thirty-fifth aspect of the present invention, in the image processing program according to the thirty-fourth aspect, the color interpolation process in the color interpolating means is performed on each pixel of the single-chip color image capturing sensor in a pixel unit having 2 rows by 2 columns of pixels in which an R pixel having a red filter and a B pixel having a blue filter are arranged, in a pixel unit having 3 rows by 3 columns of pixels in which the R pixel or the B pixel is located at the center thereof and the other color pixels are arranged around the center, or in a pixel unit having 3 rows by 3 columns of pixels in which two R pixels and two B pixels are arranged, and the transformation formula is replaced according to a value of the R pixel or the B pixel.

In this way, it is possible to obtain the same effects as those in the sixth aspect, and it is also possible to allow a general-purpose computer system, such as a personal computer (PC), as well as a dedicated computer system to execute software, similar to the twenty-first aspect. Therefore, it is possible to economically and easily realize the functions of the program.

In addition, it is possible to easily change the functions of the program only by rewriting the program.

An image processing program of the twenty-sixth aspect allows a computer to function as: a color interpolation processing unit for performing a color interpolation process on single-color pixel data for a pixel output from a single-chip color image capturing sensor to calculate color data for each pixel; a YC converting unit for separately converting the color data calculated by the color interpolation processing unit into a brightness signal Y and a color-difference signal C using two or more types of transformation formulas and for respectively synthesizing the brightness signals Y and the color-difference signals C using a predetermined coefficient; and a filtering unit for performing a predetermined filtering process on the brightness signal Y and the color-difference signal C synthesized by the YC converting unit.

In this way, it is possible to obtain the same effects as those in the seventh aspect, and it is also possible to allow a general-purpose computer system, such as a personal computer (PC), as well as a dedicated computer system to execute software, similar to the twentieth aspect. Therefore, it is possible to economically and easily realize the functions of the program. In addition, it is possible to easily change the functions of the program only by rewriting the program.

An image processing program of the thirty-seventh aspect allows a computer to function as: color interpolating means for performing a color interpolation process on single-color pixel data for a pixel output from a single-chip color image capturing sensor to calculate color data for each pixel; YC converting means for separately converting the color data calculated by the color interpolating means into a brightness signal Y and a color-difference signal C using different transformation formulas; filtering means for performing a predetermined filtering process on the brightness signals Y and the color-difference signals C respectively converted by the YC converting means; inverting means for separately inverting the brightness signals Y and the color-difference signals C filtered by the filtering means into the color data; and data synthesizing means for synthesizing the color data inverted by the inverting means using predetermined coefficients.

In this way, it is possible to obtain the same effects as those in the eighth aspect, and it is also possible to allow a general-purpose computer system, such as a personal computer (PC), as well as a dedicated computer system to execute software, similar to the twenty-first aspect. Therefore, it is possible to economically and easily realize the functions of the program. In addition, it is possible to easily change the functions of the program only by rewriting the program.

According to the thirty-eighth aspect of the present invention, in the image processing program according to the thirty-sixth or thirty-seventh aspect, the color interpolation process in the color interpolation processing unit is performed on each pixel of the single-chip color image capturing sensor in a pixel unit having 2 rows by 2 columns of pixels in which an R pixel having a red filter and a B pixel having a blue filter are arranged, in a pixel unit having 3 rows by 3 columns of pixels in which the R pixel or the B pixel is located at the center thereof and in which the other color pixels are arranged around the center, or in a pixel unit having 3 rows by 3 columns of pixels in which two R pixels and two B pixels are arranged.

In this way, it is possible to obtain the same effects as those in the ninth aspect, and it is also possible to allow a general-purpose computer system, such as a personal computer (PC), as well as a dedicated computer system to execute software, similar to the twenty-first aspect. Therefore, it is possible to economically and easily realize the functions of the program.

In addition, it is possible to easily change the functions of the program only by rewriting the program.

A computer-readable storage medium of the thirty-ninth aspect has the image processing program according to any one of the thirtieth to thirty-eighth aspects thereon.

In this way, it is possible to easily exchange the image processing program according to any one of the thirtieth to thirty-eighth aspects through a storage medium, such as CD-ROM, DVD-ROM, or FD.

BRIEF DESCRIPTION OF THE DRAWINGS

FIGS. 8A to 8E are views illustrating YC transformation formulas.

FIGS. 9A to 9C are views illustrating the correspondence between threshold value conditions of color data and the YC transformation formulas used.

FIGS. 11A to 11C are views illustrating the correspondence between the threshold value conditions and weights of transformation formula synthesis.

FIGS. 12A to 12E are views illustrating inverse transformation formulas corresponding to the YC transformation formulas used in the present embodiment.

FIG. 14 is a table related to a coefficient $\alpha$ based on a ratio of R to G.

FIG. 15 is a table related to a coefficient $\beta$ based on a ratio of B to G.

DETAILED DESCRIPTION

Hereinafter, preferred embodiments of the present invention will be described in detail with reference to the accompanying drawings.

Figure 1:
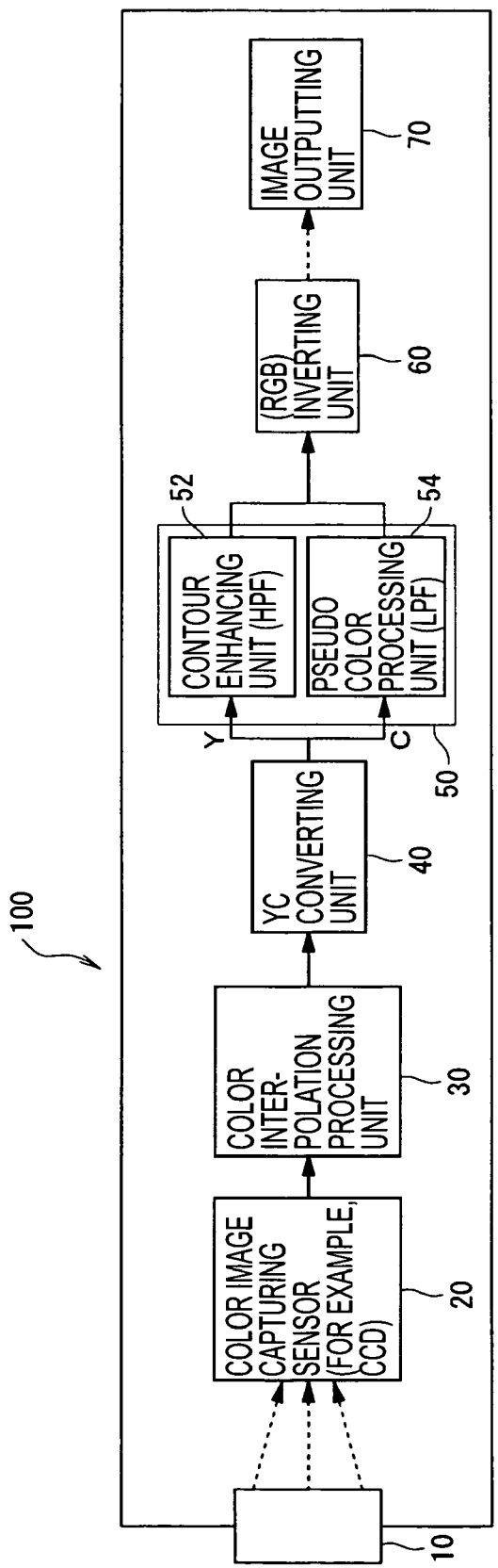
FIG. 1 is a block diagram illustrating a first embodiment of an image processing device according to the present invention.

FIG. 1 is a view illustrating a first embodiment of an image processing device 100 according to the present invention.

As shown in FIG. 1, the image processing device 100 comprises a camera lens (hereinafter, simply referred to as 'a lens') 10 for capturing a subject, a single-chip color image capturing sensor 20 for capturing an image passing through the lens 10, a color interpolation processing unit 30 for performing a simple color interpolation process on the image captured by the color image capturing sensor 20, a YC converting unit 40 for dividing color (RGB) data subjected to the color interpolation process in the color interpolation processing unit 30 into a brightness component (Y) and a color-difference component (CbCr), a filtering unit 50 for performing a predetermined filtering process on the brightness component (Y) and the color-difference component (CbCr) divided by the YC converter 40, an inverting unit 60 for inverting the YC signal filtered by the filtering unit 50 into the original color (RGB) signal, and an image outputting unit 70 for performing a predetermined image process, such as a white balance process or correction process, on image data obtained from the color signal restored by the inverting unit 60 and for visually outputting it.

Further, the filtering unit 50 comprises an outline enhancing unit 52 for compensating or enhancing outline information of the edge of an image lost in the color interpolation processing unit 30 with respect to the brightness component Y and for increasing the resolution of the image and a pseudo color processing unit 54 for removing a pseudo color generated in the course of the color interpolating process with respect to the color-difference component C.

The lens 10, the color image capturing sensor 20, the color interpolation processing unit 30, the YC converting unit 40, the filtering unit 50, the inverting circuit 60, the image outputting unit 70, and the like constituting the image processing device 100 are generally composed of the same devices as those in the conventional arts. However, particularly, the present invention is characterized by the structure of the YC converting unit 40.

That is, as will be described later, the YC converting unit 40 has a plurality of YC transformation formulas and functions to select the optimum YC transformation formula for color data of each pixel transmitted from the color interpolation processing unit 30 and to divide the color data subjected to the color interpolating process into the brightness component (Y) and the color-difference component (CbCr).

Furthermore, process functions of the color interpolation processing unit 30, the YC converting unit 40, the filtering unit 50, the inverting unit 60, etc., constituting the image processing device 100 can be generally executed by a computer system including hardware composed of a central processing unit or a main storage device and dedicated software (processing programs) manufactured for each function.

Figure 2:
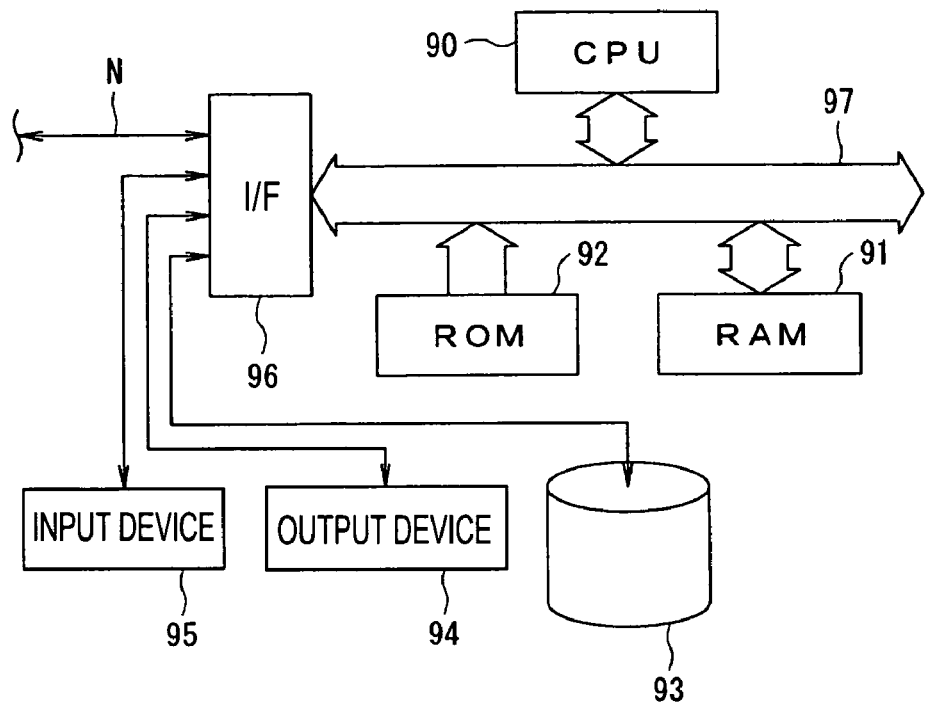
FIG. 2 is a block diagram illustrating the structure of hardware for realizing the image processing device.

That is, as shown in FIG. 2, in the computer system for realizing the image processing device 100, a CPU (Central Processing Unit) 90 for performing various control and calculation processes, a RAM (Random Access Memory) 91 used in a main storage device, a ROM (Read Only Memory) 92, which is a storage device for performing only reading, a secondary storage device 93, such as a hard disk drive device (HDD) or a semiconductor memory, an output device 94, such as a monitor (a LCD (liquid crystal display) or a CRT (cathode ray tube)), an input device 95 (that is, the color image capturing sensor 20 in the present invention), and input/output interfaces (I/F) 96 for these devices are connected to each other by various internal and external buses 97, such as a memory bus, a system bus, an input/output bus, and a processor bus composed of a PCI (Peripheral Component Interconnect) bus or an ISA (Industrial Standard Architecture) bus.

For example, various control programs or data supplied from a storage medium, such as a CD-ROM, a DVD-ROM, or a flexible disk, or supplied through a communication network (LAN, WAN, or Internet) N are installed in the secondary storage device 93, and the programs or data are loaded into the main storage device 91 as necessity requires. Then, the CPU 90 executes predetermined control and calculation processes using various resources according to the programs loaded into the main storage device 91 and then outputs the processed results (processed data) to the output device 94 through the bus 97 to display an image. Further, the CPU 90 appropriately stores the data into a database formed by the secondary storage device 93 and holds (updates) the data, if necessary.

Further, a conventional image capturing device, such as CCD (Charge Coupled Device) or a CMOS (Complementary Metal Oxide Semiconductor), is used the color image capturing sensor 20 as it is, and a single-chip image capturing sensor is used for obtaining remarkable effects. In addition, a double-chip image capturing sensor may be used.

Furthermore, the image outputting unit 70 for visibly displaying an image before or after processing includes a soft-copy device, such as a CRT or an LCD, a hard-copy device, such as a laser printer or an inkjet printer, a dedicated circuit (substrate) for image output, such as a so-called graphic accelerator or a video camera, and the like.

Moreover, the image processing device using the color image capturing sensor 20 requires a block (for example, exposure control) for controlling another color image capturing sensor 20 and a block (for example, automatic white balance) for processing colors. However, in the present invention, since these blocks do not largely take part in the image processing device, it is possible to constitute the image processing device with the conventional technique. Therefore, in the present embodiment, these blocks are not mentioned.

Further, these units 10, 20, 30, 40, 50, 60, and 70 may be incorporated into a casing of a portable device, such as a portable digital camera or a handy video camera. In addition, a portion of each unit, for example, only the image outputting unit 70 composed of a liquid crystal monitor may be arranged to be physically separated.

Next, an example of an image processing method executed by the image processing device 100 of the present invention having the above-mentioned structure will be described.

Figure 3:
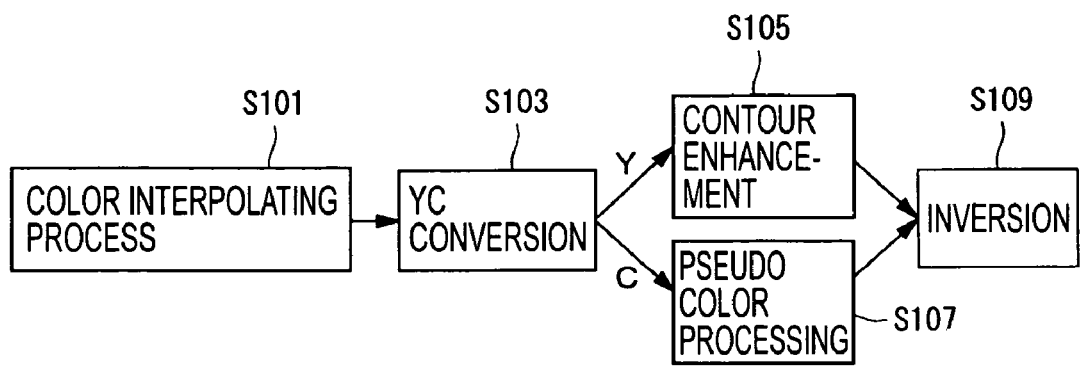
FIG. 3 is a flow chart illustrating a flow from a color interpolation process to an image output process.

Image data acquired by the single-chip color image capturing sensor 20 is subjected to a process for removing noise unique to the sensor or a gain adjusting process for adjusting brightness and is then subjected to A/D conversion. Then, as shown in FIG. 3, the converted data is transmitted to the color interpolation processing unit 30, and the color interpolation processing unit 30 performs a simple color interpolation process on all pixels (step 101) and transmits the processed data to the YC converting unit 40.

Here, the simple color interpolation process performed by the color interpolation processing unit 30 will be simply described with reference to FIGS. 4 to 7.

The color interpolation process in the color interpolation processing unit 30 is a process in which, in the case of image data captured by the color image capturing sensor 20, such as a single-chip CCD, color information deleted from each pixel is forecast-interpolated from pixels having the same color in the vicinity thereof to restore primary color signals R, G, and B of one pixel.

Figure 4:
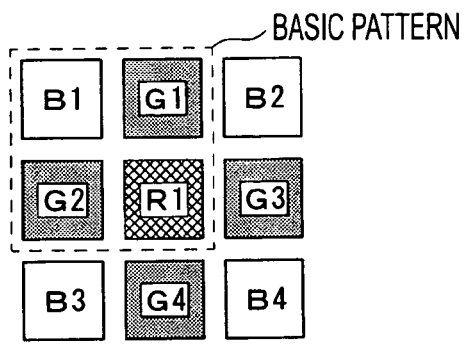
FIG. 4 is a view illustrating an example of an arrangement pattern of color filters.
Figure 5:
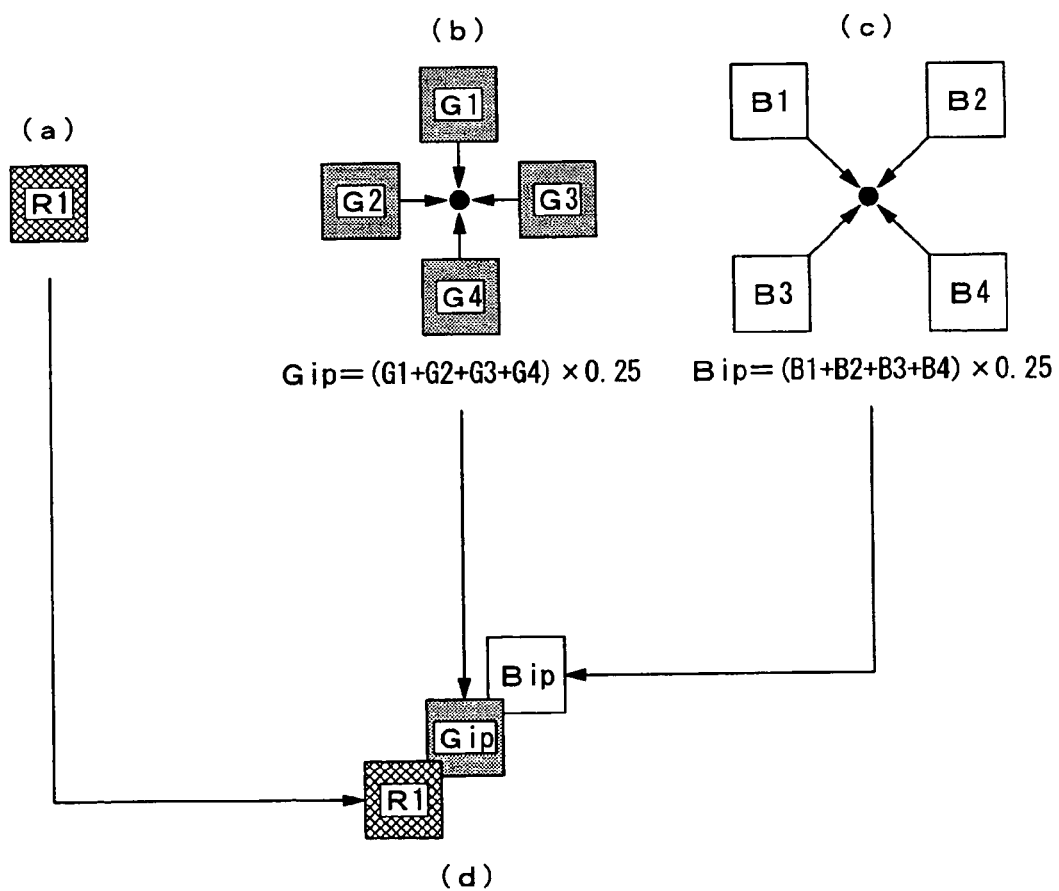
FIG. 5 is an explanatory diagram illustrating an example of a color interpolation process on a pixel unit having 3 rows by 3 columns of pixels.

For example, in a color filter arrangement in which red, green, and blue color filters mounted on the single-chip CCD are arranged in a block shape, as shown in FIG. 4, a substrate pattern composed of one B (Blue) film, one R (Red) film, and two G (Green) films is arranged vertically and horizontally. In this case, assuming that a target pixel to be subjected to the color interpolation process is located at the center of FIG. 4, a pixel corresponding to the target pixel 'R1' does not have color information on 'red'.

Therefore, as shown in FIG. 5A, the color information of the target pixel 'R1' on 'red' is adopted as it is. However, as shown in FIG. 5A, for color information (Gip) on 'green', first, the average value of color information on 'green' pixels arranged around the target pixel 'R1' is calculated. That is, pixel values of four 'green' pixels 'G1', 'G2', 'G3', and 'G4' arranged around the target pixel 'R1' are calculated, and then the average value of the pixel values is calculated. Then, the average value of the pixel values ((G1+G4+G2+G3)×0.25) is forecast-interpolated as the color information (Gip) on 'green' of the target pixel 'R1'.

Similarly, as shown in FIG. 5C, for color information (Bip) on 'blue' of the target pixel 'R1', first, the average value of color information on 'blue' pixels arranged around the target pixel 'R1' is calculated. That is, pixel values of four 'blue' pixels 'B1', 'B2', 'B3', and 'B4' arranged around the target pixel 'R1' in the oblique directions are calculated, and then the average value of the pixel values is calculated. Then, the average value of the pixel values ((B1+B4+B2+B3)×0.25) is forecast-interpolated as the color information (Bip) on 'blue' of the target pixel 'R1'.

Therefore, such a color interpolation process is sequentially performed on all pixels or is simultaneously performed on a plurality of regions obtained by dividing pixels in a parallel manner, such that color components deleted from the respective pixels are forecast-interpolated, thereby reproducing the original color of an image.

Figure 6A:
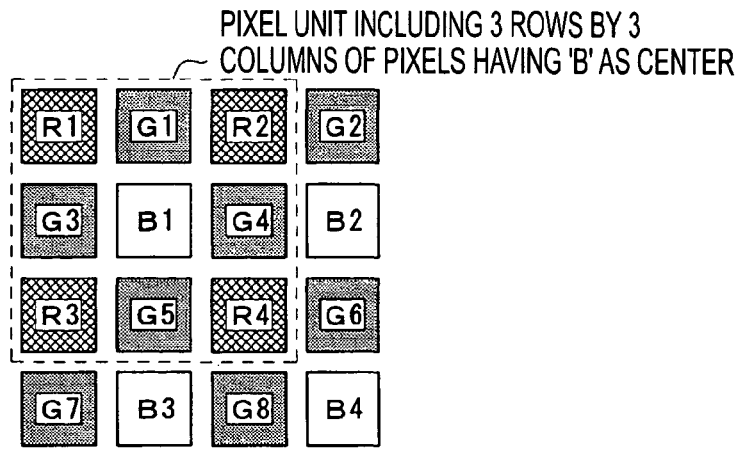
FIGS. 6A and 6B are view illustrating a color interpolation process pattern of the color filters.
Figure 6B:
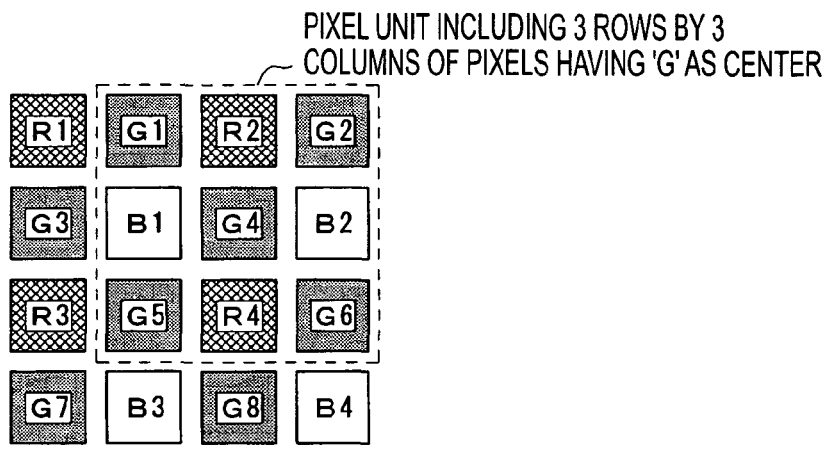

Further, as a pattern in which the color interpolation process is performed on a pixel unit having 3 rows by 3 columns of pixels, a pattern having a pixel 'B(B1)' as its center as shown in FIG. 6A, a pattern having a pixel 'G(G4)' as its center as shown in FIG. 6B, and a pattern having a pixel 'R(R1)' as its center are considered. In the pattern shown in FIG. 6B, with respect to 'G', the weighted average value of five 'green' pixels in which a target pixel has a large weight value, is adopted as a G value of the target pixel. With respect to 'R', the average value of two pixels (R2 and R4) located at the upper and lower sides of the target pixel is adopted as an R value of the target pixel. In addition, with respect to 'B', the average value of two pixels (B1 and B2) located at the left and right sides of the target pixel is adopted as a B value of the target pixel.

Figure 7:
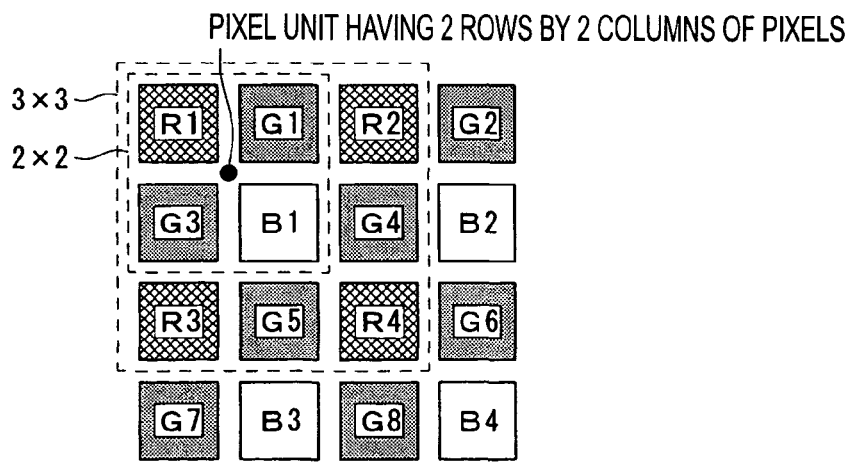
FIG. 7 is a view illustrating an example of the color interpolation process on a pixel unit having 2 rows by 2 columns of pixels.
Figure 10:
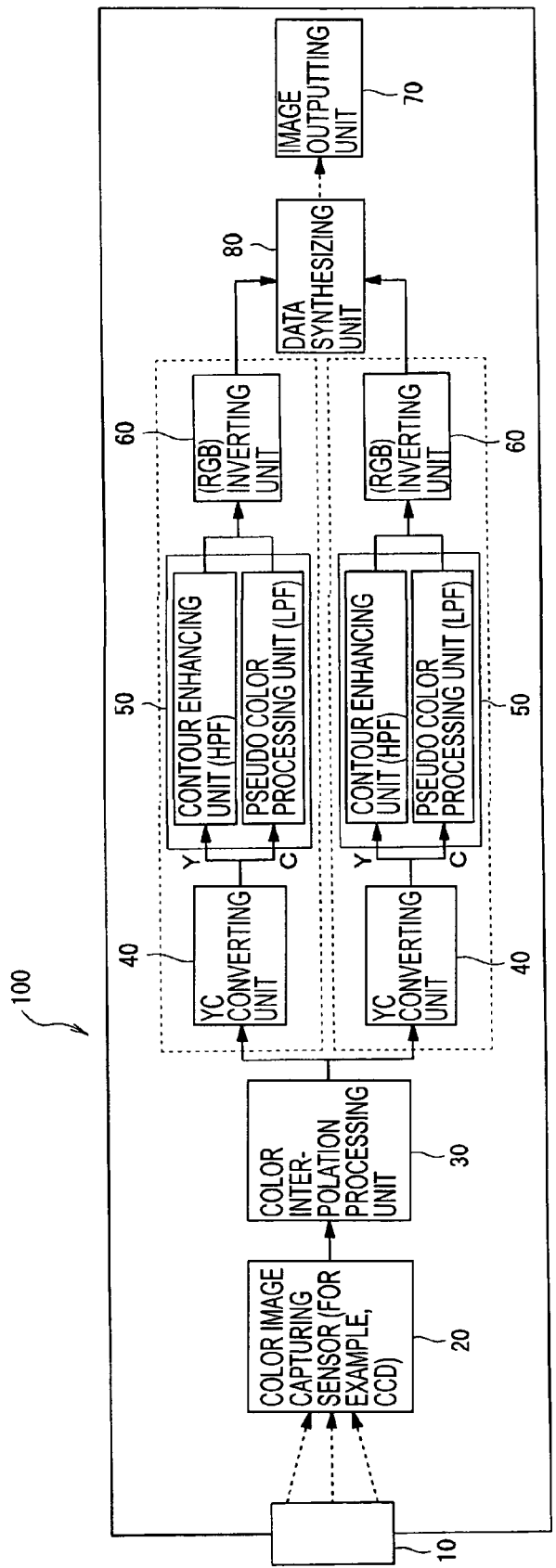
FIG. 10 is a block diagram illustrating another embodiment of the image processing device according to the present invention.

Further, the simple color interpolation process is generally performed not only in the pixel unit having 3 rows by 3 columns of pixels but also in a pixel unit having 2 rows by 2 columns of pixels as shown in FIG. 7. In the case in which the process is performed in the pixel unit having 2 rows by 2 columns of pixels, assuming that a target pixel to be subjected to the color interpolation process is present in a lattice portion between pixels, a value 'R(R1)' and a value 'B(B1)' in the pattern having 2 rows by 2 columns of pixels are respectively used as an 'R value' and a 'B value' as it is, and the average value of two values 'G(G1, G3)' in the pattern is used as a 'G value'.

In the color interpolation process by the color interpolation processing unit 30, color data which does not exist in the target pixel is created by a supposition method using pixel values around the target pixel. Therefore, in a portion, such as the edge of an image, in which pixel values are suddenly varied, since it is difficult to calculate a correct value, a pixel may easily have a color balance different from its original color balance.

Therefore, it is necessary to perform a filtering process on the color data generated by the color interpolation process in order to solve the above-mentioned problem.

That is, as shown in the block diagram of FIG. 3, the color data subjected to the color interpolation process is transmitted to the YC converting unit 40, and the YC converting unit 40 converts the data into a brightness signal (Y) and a color-difference signal (C) (step S103).

The converting process by the YC converting unit 40 from the color (RGB) data into the brightness signal (Y) and the color-difference signal (C) is performed by selecting one of a plurality of YC transformation formulas, based on the color data value.

For example, in the case in which the color data obtained by the color interpolation processing unit 30 is an RGB value, the magnitude of 'R' and 'B' values with respect to a value of 'G' is determined, and parameters for determining a plurality of threshold values, such as t1<t2<t3 . . . are set. That is, the larger color value among R and B is selected. R and B mean to select a color having a larger value out of 'R' or 'B' in terms of a technical configuration. Then, depending upon which of R and B (or both) is selected, and its relationship to G, a plurality of different YC transformation formulas A, B, C are created by using the parameters, and the formulas are held in the YC converting unit 40. For example:

if R, B<G×t1→transformation formula A
if G×t1≦R, B<G×t2→transformation formula B
if G×t2≦R, B<G×t3→transformation formula C
if G×t3≦ . . .

FIG. 8 illustrates five transformation formulas A to E as the YC transformation formula, and FIGS. 9A to 9C are tables for illustrating the relationship between threshold value conditions and the transformation formulas used.

In the five YC transformation formulas A to E shown in FIG. 8, the brightness signal Y is calculated based on the relationship R×K1+G×K2+B×K1 (where K1+K2+K1=1.0), and the color-difference signal C(Cb, Cr) is calculated based on the difference between the values 'R' and 'Y' and the difference between the values 'B' and 'Y'.

For example, in the YC transformation formula A shown in FIG. 8, a coefficient 'K1' is '0.25' and a coefficient 'K2' is '0.5'. In addition, a value of 'G' with respect to all brightness signals Y is '0.5', and values of 'R' and 'B' are '0.25', respectively. Further, a color-difference signal 'Cb' is '−0.25, −0.5, and 0.75', which is a difference between the values 'R' and 'Y', and a color-difference signal 'Cr' is '0.75, −0.5, and −0.25', which is a difference between the values 'B' and 'Y'.

FIG. 9A shows an example in which the color data obtained by the interpolation processing unit 30 is divided into five patterns using four threshold values 't1 (1.125)', 't2 (1.375)', 't3 (1.625)', and 't4 (1.875)' and in which the above-mentioned five YC transformation formulas A to E are assigned to these patterns, respectively.

Therefore, according to the table shown in FIG. 9A, as a result of analyzing the RGB values obtained by the color interpolation processing unit 30, when the value of 'R' or 'B' is smaller than 'G'×1.125, the YC transformation formula A is selected, and when the value is larger than 'G'×1.125 and smaller than 'G'×1.375, the YC transformation formula B is selected. In addition, when the value of 'R' or 'B' is larger than 'G'×1.375 and smaller than 'G'×1.625, the YC transformation formula C is selected. That is, with an increase in the value of 'R' or 'B', a transformation formula for increasing the value of 'G' is selected, so that the influence by the value of 'R' or 'B' is reduced. As such, a filter is provided technically having a larger value from among 'R' or 'B'.

Furthermore, FIG. 9B illustrates an example in which the color data is divided into three patterns using two threshold values, and in which an appropriate one of the above-mentioned five YC transformation formulas A to E is assigned to these patterns, respectively. FIG. 9C illustrates an example in which the color data is divided into two patterns using one threshold value, and in which an appropriate one of the above-mentioned five YC transformation formulas A to E is assigned to these patterns, respectively.

In the YC converting process which represents an aspect of the present invention, the plurality of YC transformation formulas are prepared in advance, and an appropriate transformation formula is selected from these YC transformation formulas according to a value of the color data. Therefore, even when the simple color interpolation is performed on only one pixel in the pixel unit to be processed so that the value of 'R' or 'B' excessively increases, it is possible to prevent the lowering of the overall resolution from occurring without being affected by the resolution of its color.

Furthermore, it is possible to use the conventional simply color interpolation process as it is, without adding any process to the color interpolation process in the color interpolation processing unit 30. Therefore, it is possible to reliably reproduce a smooth and natural edge, and an increase in load for image processing does not occur.

In the present embodiment, the 'color data' includes color data obtained by a three-color filter (generally referred to as a primary color filter) constructed by arranging 'R', 'G', and 'B' filters in each pixel, color data obtained by a four-color filter (generally referred to as a complementary color filter) constructed by arranging 'C (cyan)', 'M (magenta)', 'Y (yellow)', and 'G (green)' filters in each pixel, and color data obtained by a three color filter (R, G, B) constructed by adding a purple color filter to the primary color filter. In addition, the YC transformation formulas used are not limited in number (type). However, since the number of YC transformation formulas is large, it is possible to more easily achieve appropriate YC transformation, but the processing load of hardware and software for selecting an appropriate YC transformation formula increases. On the other side, when the number of YC transformation formulas is small, it is difficult to obtain the desired image quality. The present inventors verified in an actual experiment that the switching between two types of transformation formulas causes the deterioration of image quality in a sampling image, compared to the conventional technique. Therefore, it is desirable that the switching be performed between three or more types of YC transformation formulas, more preferably five or more types of YC transformation formulas.

When the optimum YC transformation formula is selected in the YC converting unit 40, color data is divided into the brightness signal (Y) and the color-difference signal (C) according to the YC transformation formula, and the brightness signal (Y) of the divided brightness signal (Y) and color-difference signal (C) is transmitted to the outline enhancing unit 52 of the filtering unit 50. Then, the outline enhancing unit 52, serving as a high-pass filter (HPF), sharpens an edge portion of a brightness image subjected to the color interpolation process, thereby compensating and enhancing the outline of the image. That is, in the above-mentioned color interpolation process, an effect of performing forecast interpolation on the deleted color information and an LPF effect of enhancing a low spatial frequency component are obtained. Therefore, the edge portion of an image becomes blunt, and high spatial frequency components are reduced. Thus, it is possible to improve the resolution a brightness image by enhancing the high spatial frequency components of the image blunted by the outline enhancing unit 52 using the HPF.

Meanwhile, the color-difference signal (C) is transmitted to the pseudo color processing unit 54 of the filtering unit 50, and the pseudo color processing unit 54 performs a process for removing a pseudo color generated by the color interpolation process using a low-pass filter (LPF) (step S107).

The brightness signal (Y) and the color-difference signal (C) subjected to the above-mentioned filtering process are transmitted to the inverting unit 60 and are then inverted into the original color (RGB) data. Then, the inverted data is subjected to a general image process, such as a white balance process, and is then transmitted to the image outputting unit 70. The image outputting unit displays the data on an LCD monitor or prints it out.

Next, another embodiment of the image processing device 100 according to the present invention will be described with respect to FIGS. 10 to 14.

As shown in the figures, in the present embodiment, a plurality of systems (two systems in the figures) each comprising the YC converting unit 40, the filtering unit 50, and the inverting unit 60 are prepared, and each system separately processes the color data subjected to the color interpolation process in parallel. A data synthesizing unit 80 provided downstream of each system synthesizes the respective color data obtained from each system at a predetermined ratio.

That is, in the above-mentioned method of the present embodiment, the YC data converted by different YC transformation formulas is filtered, regarded as an image on the same plain. Therefore, when the YC transformation formula is replaced by a little difference in threshold value, an absolutely different YC value may be obtained. For example, when YC-converting (R, G, B)=(100, 200, 150) using the YC transformation formula A shown in FIG. 8, the following is obtained:

(Y,Cb,Cr)=(162.5,−12.5,−62.5).

However, when YC-converting it using the YC transformation formula E, the following is obtained:

(Y,Cb,Cr)=(200,−50,−100).

Therefore, the obtained values may be greatly different from each other.

In this case, these can be considered as different plains. Therefore, in the present embodiment, a plain is prepared for every YC transformation formula, and a filtering process is performed on each plain to create color data. In addition, the color data created by a YC transformation formula suitable for each pixel is selected, and the selected color data is synthesized. However, when a plain is prepared separately with respect to each YC transformation formula, many calculation processes should be performed in parallel. For example, in consideration of a case in which the five YC transformation formulas are used as shown in FIG. 8, five processing systems (five pulses) each having a process flow of 'YC conversion→filtering→inversion' are required.

However, it is not necessary to prepare pulses for five transformation formulas in practice. For example, the transformation formula C shown in FIG. 8 is the same formula as that obtained by synthesizing the transformation formula A with the transformation formula E at a ratio of 1 to 1 (although a delicate difference occurs under the influence of, for example, the filtering process, the difference can be neglected).

Therefore, when two YC transformation formulas A and E shown in FIG. 8 are used, the processes by the two transformation formulas are separately performed, and the data synthesizing unit 80 synthesizes the two transformation formulas according to the ratio of the respective color data subjected to the color interpolation process, it is possible to obtain the same effects as those in the above-mentioned embodiment, and it is also possible to process various patterns without preparing a large number of YC transformation formulas, only by changing the synthesis ratio.

Herein, as the synthesis ratio of two color data, five types, three types, and two types respectively using four threshold values, two threshold values, and one threshold value shown in FIGS. 11A to 11C are considered. For example, in the table shown in FIG. 11A, when the value of 'R' or 'B' is smaller than 'G'×1.125, only a value converted by the YC transformation formula A is used. When the value is larger than 'G'×1.125 and smaller than 'G'×1.375, it is possible to obtain the optimum color data by using a value converted by the YC transformation formula A and a value converted by the YC transformation formula E at a ratio of '0.75' to '0.25'. As such, a filter is provided technically having a larger value from among 'R' or 'B'.

Herein, if choices of the synthesis ratio of the converted results by the respective YC transformation formulas are two as shown in FIG. 11C, the appropriate reproduction of the edge is apt to be lowered due to the unsuitableness of the threshold value. Therefore, in order to obtain more suitable color data (image), it is preferable that the choice of the synthesis ratio of the converted results by the respective YC transformation formulas be large from the viewpoint of threshold value setting tolerance. In particular, in the present embodiment, even when the choice of the synthesis ratio is increased a little, hardware and software are not greatly complicated. Therefore, it is preferable that the choice of the synthesis ratio is about five stages according to the results obtained by an actual experiment.

Further, FIG. 12 is a view illustrating inverse transformation formulas (YC→RGB) corresponding to the five YC transformation formulas A to E used in the present embodiment.

In the present embodiment, values related to 'brightness' are used as the pixel values. However, instead of the values related to 'brightness', values related to 'density' may be used. In this case, the same effects can also be obtained.

However, 'brightness' is proportional to the quantity of light. That is, the larger the value of brightness is, the higher brightness becomes (for example, when brightness is doubled, the quantity of light is also doubled). However, the larger the value of 'density' is, the darker a color tone becomes. That is, the 'density' defines the transmission of light using a logarithm whose base is 10. When the 'density' is doubled, the quantity of light is increased by one-tenth times.

Therefore, when values related to the 'contrast' are used instead of the values related to the 'brightness', it is necessary to change the switching conditions or to convert the contrast into the brightness.

Figure 13:
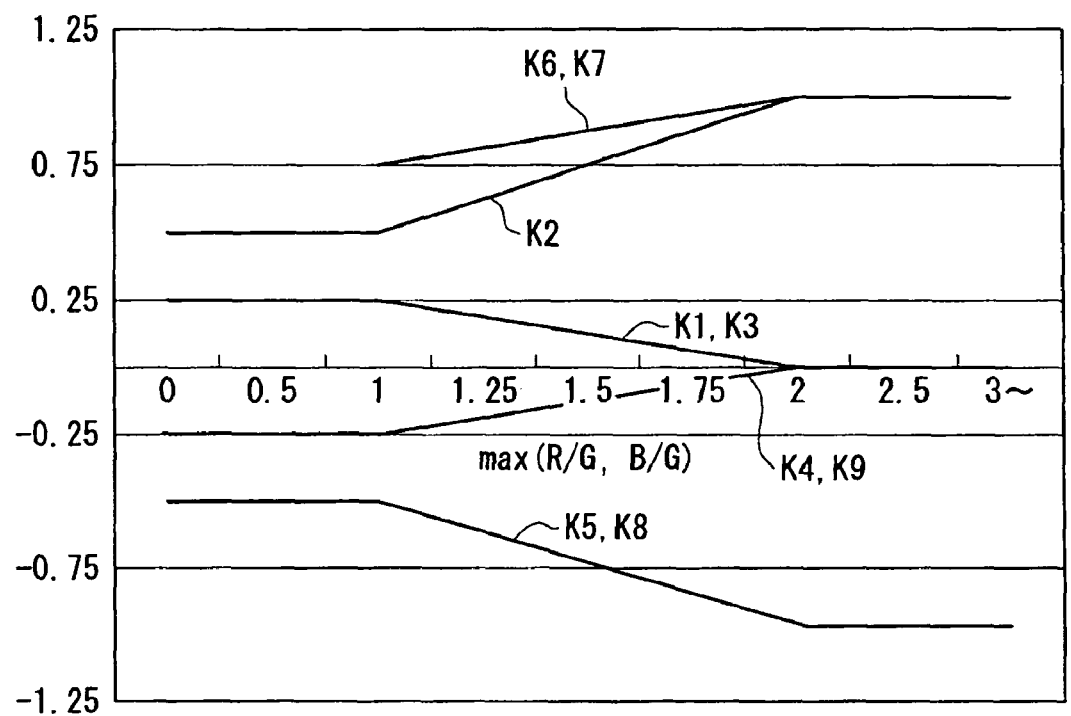
FIG. 13 is a graph illustrating the relationship between coefficients used for the transformation formulas and a ratio thereof.

Further, in the present embodiment, predetermined coefficients are used as the coefficient of the YC transformation formulas, and several YC transformation formulas are selected from a plurality of YC transformation formulas previously prepared. However, the optimum coefficient or YC transformation formula may be created whenever a process is performed. For example, as shown in FIG. 13, a larger value can be selected from ratios of R/G and B/G, and coefficients K1 to K9 can be determined based on the selected value. In FIG. 13, the horizontal axis represents a ratio value to be calculated, and the vertical axis represents the values of the respective coefficients K1 to K9 used for each ratio value.

As described above, the maximum value is detected from the color data calculated by the color interpolation process for each pixel, and a ratio of the maximum value to the value of a specific color is calculated. Then, when determining the transformation formula based on the ratio, the following is considered as other variations for selecting the transformation formula based on the ratio.

That is, in the present embodiment, in the calculation of Y, control is performed such that the coefficients related to R and B are equal to each other (K1=K3). However, a ratio of G to R can be compared to a ratio of G to B to perform separate control. In this variation, ratios of a specific color (G) to colors (R and B) other than the specific color are separately calculated based on the ratios of the specific color to colors other than the specific color, and the transformation formula is controlled based on the calculated ratios.

In the method of changing the coefficient, on the basis of the YC transformation formula shown in FIG. 13, the relationships Cb=B−Y and Cr=R−Y are calculated. Therefore, when determining only the Y transformation formula, the values Cb and Cr are omitted since these values are can be calculated. Then, the following expression is obtained:

$Y=K1 \cdot R+K2 \cdot G+K3 \cdot B$ (on the basis of $Y=0.25R+0.5G+0.25B$).

Thus, it is possible to define the coefficients K1 to K3 form the above-mentioned expression.

In the range of a ratio of R to B, the coefficient K1 is subtracted from a basic formula by a value of α, and the value of α is added to the coefficient K2, according to the table shown in FIG. 14. Further, in the range of a ratio of B to G, the coefficient K3 is subtracted from the basic formula by a value of β, and the value of β is added to the coefficient K2, according to the table shown in FIG. 15.

Accordingly, it is possible to create a transformation formula based on the following relationships calculated by the ratio of R to B and the ratio of G to G;

$K1=K1-\alpha, K2=K2+\alpha+\beta, K3=K3 \cdot \beta$.

Further, it is possible to perform YCbCr conversion using the created transformation formula. Since an inverse transformation formula can be calculated using a Gaussian elimination method, a description thereof will be omitted.

Figure 16:
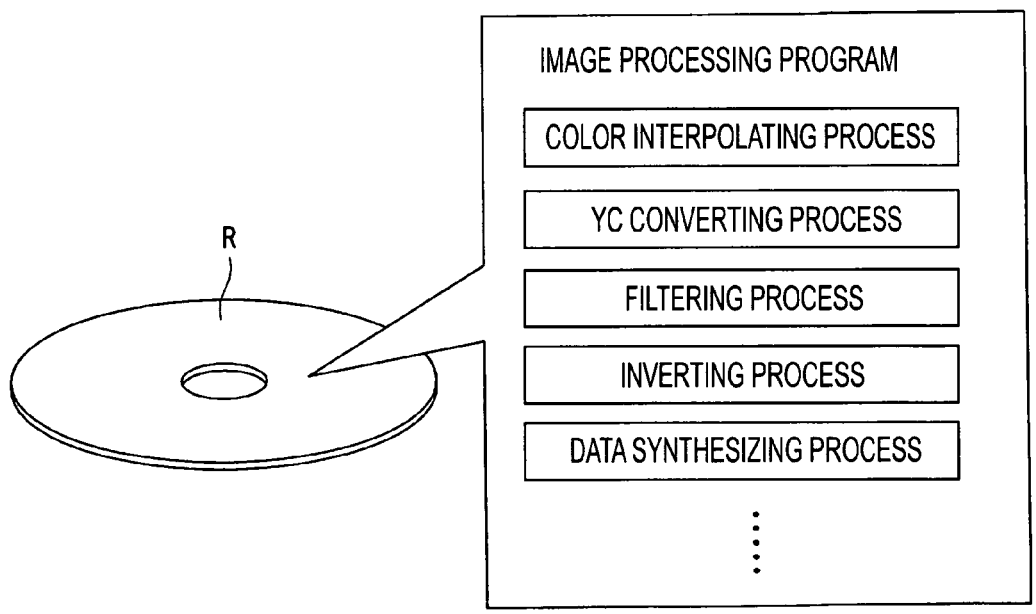
FIG. 16 is a conceptual view illustrating an example of a computer readable storage medium on which an image processing program according to the present invention is recorded.

Furthermore, an image processing program according to the present invention can be recorded not only a hard disk drive (HDD) device and nonvolatile semiconductor storage media, but also on appropriately replaceable and distributable storage media including magnetic storage media, such as FD, HD, and MD, and computer readable storage media including optically readable storage media, such as CD-ROM and DVD-ROM, and opto-magnetic storage media, such as R and MO, as shown in FIG. 16. When using these storage media, it is possible to easily provide the image processing program of the present invention to authorized users.

Moreover, in the present embodiment, a single-chip image capturing sensor is used, and one-pixel and one-color image data is described. However, the image processing method of the present invention can be applied to one-pixel and two-color image data obtained by a so-called two-chip image capturing sensor.

What is claimed is:

1. A method of processing an image performed by an image processing device, the image being output from a single-chip color image capturing sensor having a first color pixel, a second color pixel, and a third color pixel, the method comprising:

calculating, with a processor of the image processing device, first color data including a first color value, a second color value, and a third color value by an interpolation process, the first color data being color data of the first color pixel;

converting, with the processor, the first color data to a first brightness signal Y and a first color-difference signal C, the first brightness signal Y being calculated by a first transformation formula selected from a plurality of transformation formulas based on a threshold value condition determined by a difference between the first color value and a value proportionate to the second color value and by a difference between the third color value and the value proportionate to the second color value, and the first color-difference signal C calculated by a difference between the first color value and the first brightness signal Y, the converting of the first color data including converting the first color data into a second brightness signal Y and a second color-difference signal C, the second brightness signal Y being calculated by a second transformation formula selected from the plurality of transformation formulas based on the threshold value condition, and the second color-difference signal C calculated by a difference between the first color value and the second brightness signal Y;

synthesizing, with the processor, the first brightness signal Y and the second brightness signal Y to generate a third brightness signal Y and synthesizing the first color-difference signal C and the second color-difference signal C to generate a third color-difference signal C; and performing, with the processor, a filtering process on the third brightness signal Y to enhance a high spatial frequency component and on the third color-difference signal C to enhance a low spatial frequency component.

2. The method according to claim 1, further comprising:
performing a filtering process on the first brightness signal Y to enhance high spatial frequency components and on the first color-difference signal C to enhance low spatial frequency components.

3. The method according to claim 1, the first color-difference signal C calculated by a difference between the third color value and the first brightness signal Y.

4. The method according to claim 1, the first color being red, the second color being green, and the third color being blue.

5. The method according to claim 4, each of the plurality of transformation formulas having R×K1+G×K2+B×K1, where R is the first color value, G is the second color value, B is the third color value, and K1+K2+K1=1.0.

6. The method according to claim 5, the first transformation formula having a condition that one of K1 and the K2 corresponds to a largest value among the first color value, the second color value, and the third color value and that one of K1 and K2 has a smaller value than the other K1 or the other K2 in the first transformation formula.

7. The method according to claim 1, the converting of the first color data further including converting the first color data into a second brightness signal Y and a second color-difference signal C, the second brightness signal Y being calculated by a second transformation formula selected from the plurality of transformation formulas based on the threshold value condition, and the second color-difference signal C calculated by a difference between the first color value and the second brightness signal Y, the method further comprising:
performing a filtering process on the first and second brightness signals Y to enhance high spatial frequency components and on the first and second color-difference signals C to enhance low spatial frequency components; and synthesizing the first brightness signal Y and the second brightness signal Y, after both signals have been filtered to generate a third brightness signal Y and synthesizing the first color-difference signal C and the second color-difference signal C to generate a third color-difference signal C.

8. An image processing device processing an image that is output from a single-chip color image capturing sensor having a first color pixel, a second color pixel, and a third color pixel, the image processing device comprising:
a color interpolation processing unit, embodied on a non-transitory computer-readable medium, calculating first color data including a first color value, a second color value, and a third color value by an interpolation process, the first color data being color data of the first color pixel;

a YC converting unit, embodied on the non-transitory computer-readable medium, converting the first color data to a first brightness signal Y and a first color-difference signal C, the first brightness signal Y being calculated by a first transformation formula selected from a plurality of transformation formulas based on a threshold value condition determined by a difference between the first color value and a value proportionate to the second color value and by a difference between the third color value and the value proportionate to the second color value, and the first color-difference signal C calculated by a difference between the first color value and the first brightness signal Y, the YC converting unit further converting the first color data into a second brightness signal Y and a second color-difference signal C, the second brightness signal Y being calculated by a second transformation formula selected from the plurality of transformation formulas based on the threshold value condition, and the second color-difference signal C calculated by a difference between the first color value and the second brightness signal Y;

a synthesizing unit, embodied on the non-transitory computer-readable medium, synthesizing the first brightness signal Y and the second brightness signal Y to generate a third brightness signal Y and synthesizing the first color-difference signal C and the second color-difference signal C to generate a third color-difference signal C; and a filtering unit, embodied on a non-transitory computer-readable medium, performing a filtering process on the third brightness signal Y to enhance a high spatial frequency component and on the third color-difference signal C to enhance a low spatial frequency component.

9. The image processing device according to claim 8, further comprising:
a filtering unit performing a filtering process on the brightness signal Y to enhance high spatial frequency components and on the color-difference signal C to enhance low spatial frequency components.

10. The image processing device according to claim 8, the YC converting unit further converting the first color data into a second brightness signal Y and a second color-difference signal C, the second brightness signal Y being calculated by a second transformation formula selected from the plurality of transformation formulas based on the threshold value condition, and the second color-difference signal C calculated by a difference between the first color value and the second brightness signal Y and, the image processing device further comprising:
a filtering unit performing a filtering process on the first and second brightness signals Y to enhance high spatial frequency components and on the first and second color-difference signals C to enhance low spatial frequency components; and a synthesizing unit synthesizing the first brightness signal Y and the second brightness signal Y, after both signals have been filtered to generate a third brightness signal Y and synthesizing the first color-difference signal C and the second color-difference signal C to generate a third color-difference signal C.

11. An electronic apparatus comprising the image processing device according to claim 8.

12. An image processing program stored in a non-transitory computer-readable storage medium, the image processing program allowing a computer to process an image that is output from a single-chip color image capturing sensor having a first color pixel, a second color pixel, and a third color pixel, the image processing program comprising:

a color interpolation portion calculating first color data including a first color value, a second color value, and a third color value by an interpolation process, the first color data being color data of the first color pixel;

a YC converting portion converting the first color data to a first brightness signal Y and a first color-difference signal C, the first brightness signal Y being calculated by a first transformation formula selected from a plurality of transformation formulas based on a threshold value condition determined by a difference between the first color value and a value proportionate to the second color value and by a difference between the third color value and the value proportionate to the second color value, and the first color-difference signal C calculated by a difference between the first color value and the first brightness signal Y, the YC converting portion further converting the first color data into a second brightness signal Y and a second color-difference signal C, the second brightness signal Y being calculated by a second transformation formula selected from the plurality of transformation formulas based on the threshold value condition, and the second color-difference signal C calculated by a difference between the first color value and the second brightness signal Y;

a synthesizing portion synthesizing the first brightness signal Y and the second brightness signal Y to generate a third brightness signal Y and synthesizing the first color-difference signal C and the second color-difference signal C to generate a third color-difference signal C; and a filtering portion performing a filtering process on the third brightness signal Y to enhance a high spatial frequency component and on the third color-difference signal C to enhance a low spatial frequency component.

13. The image processing program according to claim 12, further comprising:

a filtering portion performing a filtering process on the brightness signal Y to enhance high spatial frequency components and on the color-difference signal C to enhance low spatial frequency components.

14. The image processing program according to claim 12, the YC converting portion further converting the first color data into a second brightness signal Y and a second color-difference signal C, the second brightness signal Y being calculated by a second transformation formula selected from the plurality of transformation formulas based on the threshold value condition, and the second color-difference signal C calculated by a difference between the first color value and the second brightness signal Y and, the image processing device further comprising:

a filtering portion performing a filtering process on the first and second brightness signals Y to enhance high spatial frequency components and on the first and second color-difference signals C to enhance low spatial frequency components; and a synthesizing portion synthesizing the first brightness signal Y and the second brightness signal Y, after both signals have been filtered to generate a third brightness signal Y and synthesizing the first color-difference signal C and the second color-difference signal C to generate a third color-difference signal C.

* * * * *